(12) United States Patent
Shalam

(10) Patent No.: US 7,791,586 B2
(45) Date of Patent: Sep. 7, 2010

(54) ENTERTAINMENT SYSTEM MOUNTABLE IN A VEHICLE SEAT

(75) Inventor: David M. Shalam, Syosset, NY (US)

(73) Assignee: Audiovox Corporation, Hauppauge, NY (US)

( * ) Notice: Subject to any disclaimer, the term of this patent is extended or adjusted under 35 U.S.C. 154(b) by 854 days.

(21) Appl. No.: 11/593,380

(22) Filed: Nov. 6, 2006

(65) Prior Publication Data
US 2007/0052618 A1 Mar. 8, 2007

Related U.S. Application Data

(63) Continuation-in-part of application No. 11/072,171, filed on Mar. 4, 2005, which is a continuation-in-part of application No. 10/438,724, filed on May 15, 2003, now Pat. No. 7,245,274.

(60) Provisional application No. 60/734,329, filed on Nov. 7, 2005.

(51) Int. Cl.
G09G 3/34 (2006.01)
(52) U.S. Cl. ........................................ 345/108; 345/156
(58) Field of Classification Search ......... 345/156–160; 297/217.3; 348/61, 148, 837; 361/679.21; 408/607
See application file for complete search history.

(56) References Cited

U.S. PATENT DOCUMENTS

| 3,019,050 | A | 1/1962 | Spielman |
| 4,647,980 | A | 3/1987 | Steventon et al. |
| 4,681,366 | A | 7/1987 | Lobanoff |
| 4,702,519 | A | 10/1987 | Kobanoff |
| 4,756,528 | A | 7/1988 | Umashankar |
| 4,836,478 | A | 6/1989 | Sweere |
| 4,843,477 | A | 6/1989 | Mizutani et al. |
| 4,982,996 | A | 1/1991 | Vottero-Fin et al. |
| 5,021,922 | A | 6/1991 | Davis et al. |
| 5,214,514 | A | 5/1993 | Haberkern |

(Continued)

FOREIGN PATENT DOCUMENTS

EP 1550583 7/2005

(Continued)

OTHER PUBLICATIONS

Notice of Office Action dated Feb. 26, 2008 to priority U.S. Appl. No. 11/072,171.

(Continued)

Primary Examiner—Nitin Patel
(74) Attorney, Agent, or Firm—F. Chau & Associates, LLC

(57) ABSTRACT

An entertainment system includes a housing adapted for being mounted within a seat of a vehicle and a media unit housed within the housing and pivotably coupled to the housing. The housing includes at least one of a groove formed within a sidewall of the housing adapted to engage a movable latch of the media unit, a first flexible member provided on a sidewall of the housing to engage a portion of the media unit for snapping the media unit into place within the housing, or a second flexible member disposed in a face of the housing to provide a spring force on the media unit in a direction away from the housing.

32 Claims, 39 Drawing Sheets

U.S. PATENT DOCUMENTS

| | | | |
|---|---|---|---|
| 5,255,214 | A | 10/1993 | Ma |
| 5,267,775 | A | 12/1993 | Nguyen |
| 5,335,076 | A * | 8/1994 | Reh et al. .................. 348/794 |
| 5,396,340 | A | 3/1995 | Ishii et al. |
| 5,410,447 | A | 4/1995 | Miyagawa et al. |
| 5,463,688 | A | 10/1995 | Wijas |
| 5,507,556 | A | 4/1996 | Dixon |
| 5,555,466 | A | 9/1996 | Scribner et al. |
| 5,610,822 | A | 3/1997 | Murphy |
| 5,667,179 | A | 9/1997 | Rosen |
| 5,793,413 | A | 8/1998 | Hylton et al. |
| 5,796,575 | A | 8/1998 | Podwalny et al. |
| 5,842,715 | A | 12/1998 | Jones |
| 5,949,345 | A | 9/1999 | Beckert et al. |
| 6,081,420 | A | 6/2000 | Kim et al. |
| 6,092,705 | A | 7/2000 | Meritt |
| 6,102,476 | A | 8/2000 | May et al. |
| 6,134,223 | A | 10/2000 | Burke et al. |
| D438,853 | S | 3/2001 | Lino |
| 6,199,810 | B1 | 3/2001 | Wu et al. |
| 6,216,927 | B1 | 4/2001 | Meritt |
| 6,266,236 | B1 | 7/2001 | Ku et al. |
| 6,292,236 | B1 | 9/2001 | Rosen |
| 6,300,880 | B1 | 10/2001 | Sitnik |
| 6,301,367 | B1 | 10/2001 | Boyden et al. |
| 6,317,039 | B1 | 11/2001 | Thomason |
| 6,337,913 | B1 | 1/2002 | Chang |
| 6,339,455 | B1 | 1/2002 | Allan et al. |
| 6,380,978 | B1 | 4/2002 | Adams et al. |
| 6,409,242 | B1 | 6/2002 | Chang |
| 6,419,379 | B1 | 7/2002 | Hulse |
| 6,443,574 | B1 | 9/2002 | Howell et al. |
| 6,587,127 | B1 | 7/2003 | Leeke et al. |
| 6,665,163 | B2 | 12/2003 | Yanagisawa |
| 6,666,492 | B1 | 12/2003 | Schmidt et al. |
| 6,669,285 | B1 | 12/2003 | Park et al. |
| 6,717,798 | B2 | 4/2004 | Bell et al. |
| 6,719,343 | B2 | 4/2004 | Emerling et al. |
| 6,724,317 | B1 | 4/2004 | Kitano et al. |
| 6,739,654 | B1 * | 5/2004 | Shen et al. ............ 297/188.04 |
| 6,754,070 | B2 | 6/2004 | Chen |
| 6,758,521 | B2 * | 7/2004 | Imamura et al. ......... 297/217.3 |
| 6,871,356 | B2 | 3/2005 | Chang |
| 6,899,365 | B2 | 5/2005 | Lavelle et al. |
| 6,979,038 | B1 | 12/2005 | Cho et al. |
| D515,522 | S | 2/2006 | Vitito |
| 7,036,879 | B2 | 5/2006 | Chang |
| 7,044,546 | B2 | 5/2006 | Chang |
| 7,070,237 | B2 * | 7/2006 | Rochel .................... 297/217.3 |
| 7,084,932 | B1 | 8/2006 | Mathias et al. |
| 7,201,354 | B1 | 4/2007 | Lee |
| 7,201,356 | B2 * | 4/2007 | Huang .................... 248/309.1 |
| 7,360,833 | B2 | 4/2008 | Vitito |
| 7,379,125 | B2 * | 5/2008 | Chang ....................... 348/837 |
| 2001/0001083 | A1 | 5/2001 | Helot |
| 2002/0005897 | A1 * | 1/2002 | Kim ........................... 348/148 |
| 2002/0024538 | A1 | 2/2002 | Bandaru et al. |
| 2002/0149905 | A1 | 10/2002 | Jackson, Jr. |
| 2002/0159270 | A1 | 10/2002 | Lynam et al. |
| 2002/0186531 | A1 | 12/2002 | Pokharna et al. |
| 2003/0021086 | A1 | 1/2003 | Landry et al. |
| 2003/0042378 | A1 | 3/2003 | Imamura et al. |
| 2003/0057749 | A1 | 3/2003 | Buono |
| 2003/0111880 | A1 | 6/2003 | Lambiaso |
| 2003/0117728 | A1 | 6/2003 | Hutzel et al. |
| 2003/0137584 | A1 * | 7/2003 | Norvell et al. ................ 348/61 |
| 2003/0184137 | A1 | 10/2003 | Jost |
| 2003/0193619 | A1 | 10/2003 | Farrand |
| 2003/0194968 | A1 | 10/2003 | Young |
| 2003/0198008 | A1 | 10/2003 | Leapman et al. |
| 2003/0220091 | A1 | 11/2003 | Farrand et al. |
| 2003/0229897 | A1 | 12/2003 | Frisco et al. |
| 2004/0007906 | A1 | 1/2004 | Park et al. |
| 2004/0032541 | A1 * | 2/2004 | Rochel ........................ 348/825 |
| 2004/0085485 | A1 | 5/2004 | Schedivy |
| 2004/0130616 | A1 | 7/2004 | Tseng |
| 2004/0224638 | A1 | 11/2004 | Fadell et al. |
| 2004/0227695 | A1 | 11/2004 | Schedivy |
| 2004/0227696 | A1 | 11/2004 | Schedivy |
| 2004/0227861 | A1 | 11/2004 | Schedivy |
| 2005/0052046 | A1 | 3/2005 | Lavelle et al. |
| 2005/0099547 | A1 | 5/2005 | Vitito |
| 2005/0110313 | A1 | 5/2005 | Vitito et al. |
| 2005/0204596 | A1 * | 9/2005 | Peng ........................... 40/320 |
| 2005/0242636 | A1 | 11/2005 | Vitito |
| 2005/0242637 | A1 | 11/2005 | Vitito |
| 2005/0242638 | A1 | 11/2005 | Vitito |
| 2006/0047426 | A1 | 3/2006 | Vitito |
| 2006/0098403 | A1 * | 5/2006 | Smith ......................... 361/683 |
| 2006/0109388 | A1 | 5/2006 | Sanders et al. |
| 2006/0112144 | A1 | 5/2006 | Ireton |
| 2006/0148575 | A1 | 7/2006 | Vitito |
| 2007/0047198 | A1 | 3/2007 | Crooijmans et al. |
| 2007/0057541 | A1 * | 3/2007 | Huang .................... 297/217.3 |
| 2007/0101039 | A1 | 5/2007 | Rutledge et al. |
| 2007/0247800 | A1 * | 10/2007 | Smith et al. ................. 361/683 |
| 2008/0170165 | A1 | 7/2008 | Lee et al. |
| 2009/0115233 | A1 * | 5/2009 | Tuccinardi et al. ........ 297/217.3 |

FOREIGN PATENT DOCUMENTS

| | | |
|---|---|---|
| FR | 2817812 | 6/2002 |
| FR | 289980 | 3/2003 |
| JP | 2001/047921 | 2/2001 |
| WO | WO 0038951 | 7/2000 |
| WO | WO 02/074577 | 9/2002 |
| WO | WO 03/029050 | 4/2003 |

OTHER PUBLICATIONS

International Search Report from corresponding PCT Application No. PCT/US2006/43432.
Notice of Allowance and Fee(s) Due from corresponding U.S. Appl. No. 10/438,724, now U.S. Patent 7,245,275.
Office Action mailed Jul. 13, 2007 from corresponding U.S. Appl. No. 10/688,611.
Office Action mailed Oct. 27, 2006 from corresponding U.S. Appl. No. 10/688,611.
Office Action mailed Jun. 16, 2006 from corresponding U.S. Appl. No. 10/688,611.
International Search Report from PCT/US2004/34371.
Office Action mailed Sep. 12, 2008 from corresponding U.S. Appl. No. 11/072,171.
Office Action mailed Sep. 22, 2008 from corresponding U.S. Appl. No. 10/808,659.
Office Action mailed Mar. 11, 2009 from corresponding U.S. Appl. No. 11/072,171.
Office Action mailed Jun. 22, 2009 from corresponding U.S. Appl. No. 11/557,177.
Supplementary EP Search Report from PCT/US2006043300 dated Jun. 15, 2009.
Office Action mailed Jul. 13, 2007 from corresponding U.S. Appl. No. 10/969,484.
Office Action mailed Aug. 2, 2006 from corresponding U.S. Appl. No. 10/969,484.
Office Action mailed Mar. 15, 2006 from corresponding U.S. Appl. No. 10/969,484.
Office Action mailed Jan. 23, 2007 from corresponding U.S. Appl. No. 10/969,484.
International Search Report for International Appln. No. PCT/US05/37356; Date of Mailing Jul. 24, 2006.
Written Opinion of the International Searching Authority for International Application No. PCT/US05/37356; Date of Mailing Jul. 24, 2006.

Supplemental Notice of Allowance Date of Mailing Mar. 4, 2005 corresponding U.S. Appl. No. 10/699,334.
Notice of Allowance Date of Mailing Oct. 14, 2004 from corresponding U.S. Appl. No. 10/699,334.
Office Action Date of Mailing Aug. 2, 2004 from corresponding U.S. Appl. No. 10/699,334.
International Search Report for International Application No. PCT/US07/00059; Date of Mailing Oct. 19, 2007.
Written Opinion of the International Searching Authority for International Application No. PCT/US07/00059; Date of Mailing Oct. 19, 2007.
Notice of Allowance and Fee(s) due from corresponding U.S. Appl. No. 10/438,724, now U.S. Patent No. 7,245,275.
Office Action mailed Jan. 10, 2007 from corresponding U.S. Appl. No. 10/438,724, now U.S. Patent No. 7,245,275.
Office Action mailed Jun. 5, 2006 from corresponding U.S. Appl. No. 10/438,724, now U.S.Patent No. 7,245,275.
Office Action mailed Oct. 4, 2005 from corresponding U.S. Appl. No. 10/438,724, now U.S. Patent No. 7,245,275.
Notification of Transmittal of International Preliminary Report on Patentability for Application No. PCT/US04/10555; Date of Mailing: Apr. 12, 2006.
Notification Concerning Transmittal of International Application as Published or Republished for Application No. PCT/US04/10555; Date of Mailing: Dec. 29, 2005.
International Search Report for International Application No. PCT/US06/43300; Date of Mailing Sep. 21, 2007.
Written Opinion of the International Searching Authority for International Application No. PCT/US06/4330; Date of Mailing Sep. 21, 2007.
Office Action mailed Dec. 24, 2009 from corresponding U.S. Appl. No. 11/072,171.
Final Office Action mailed Jan. 7, 2010 from corresponding U.S. Appl. No. 11/557,177.
Final Office Action mailed Mar. 16, 2010 from corresponding U.S. Appl. No. 11/649,121.
Final Office Action mailed Sep. 1, 2009 from corresponding U.S. Appl. No. 11/072,171.
Office Action mailed Aug. 24, 2009 from corresponding U.S. Appl. No. 11/649,121.
Office Action issued from the European Patent Office (EPO) on Feb. 18, 2010 corresponding to European Patent Application No. 06837036.0 (PCT US200604300).

* cited by examiner

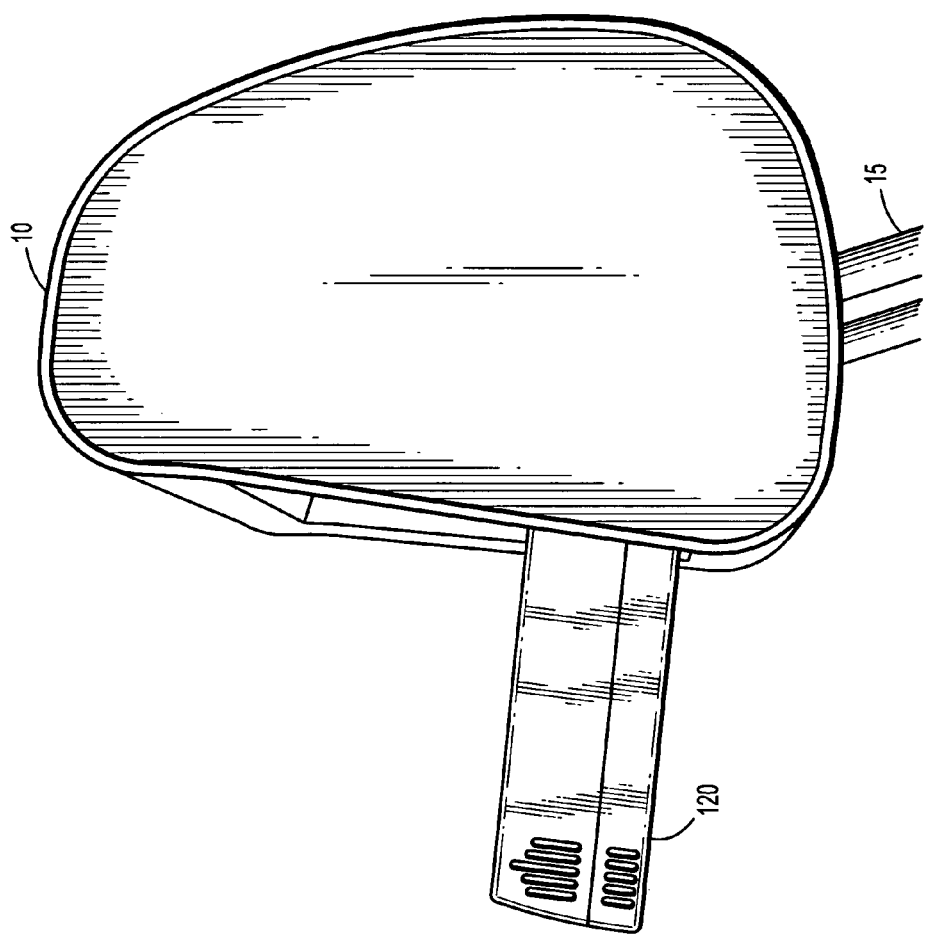

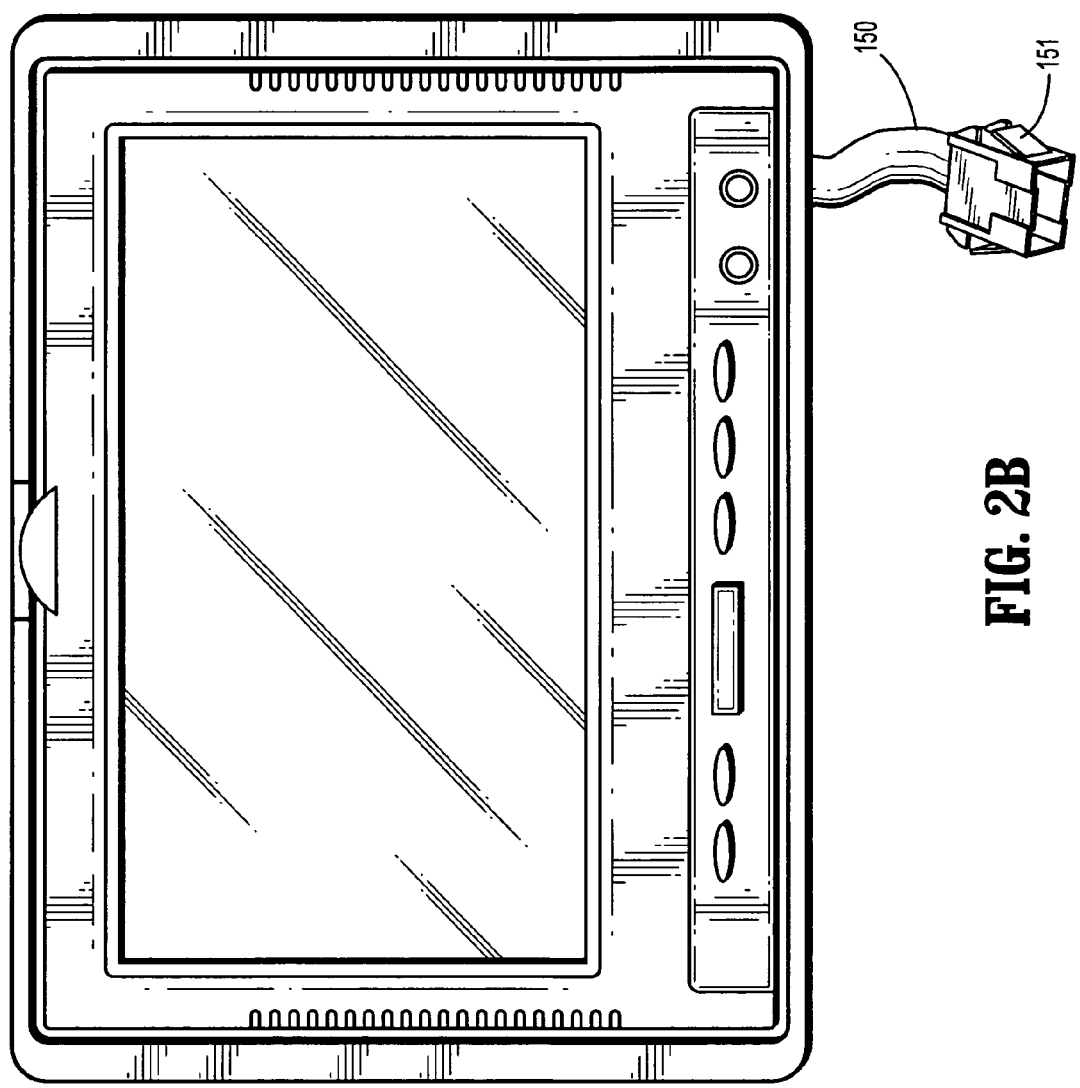

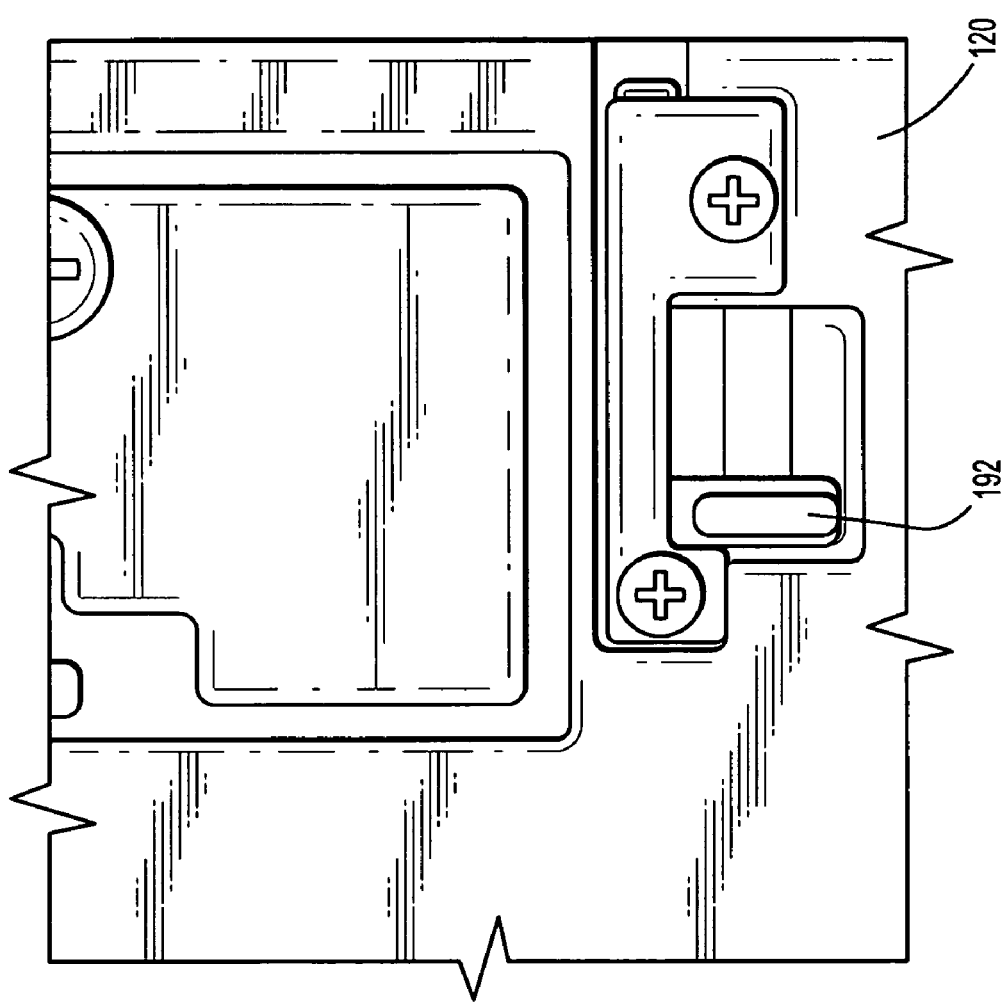

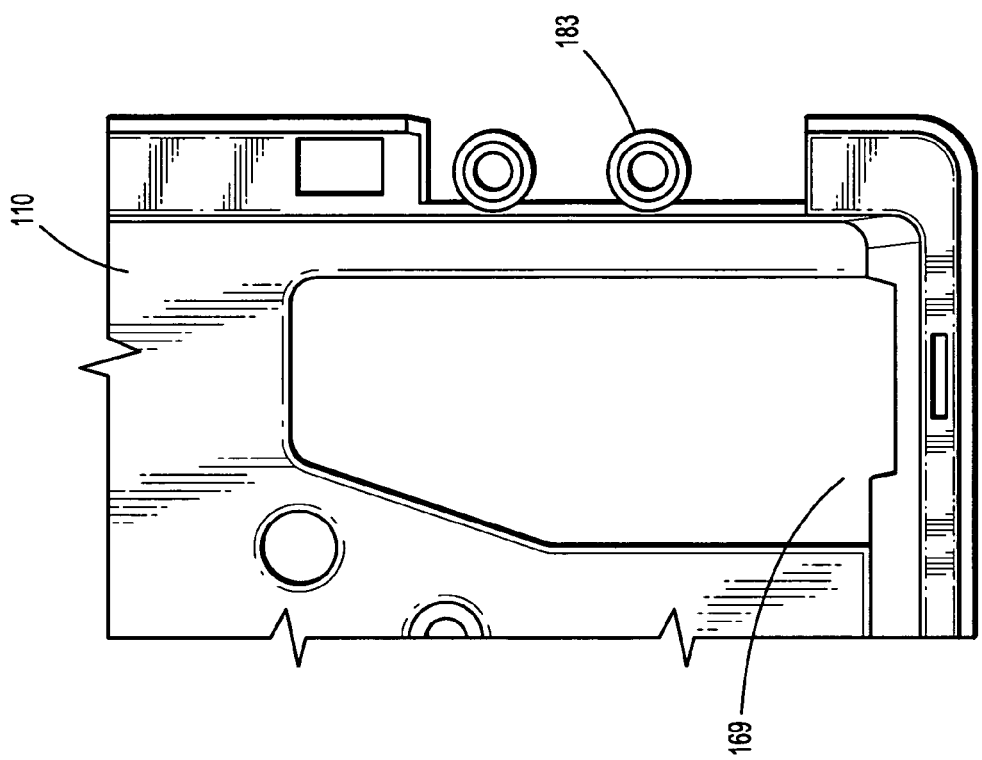

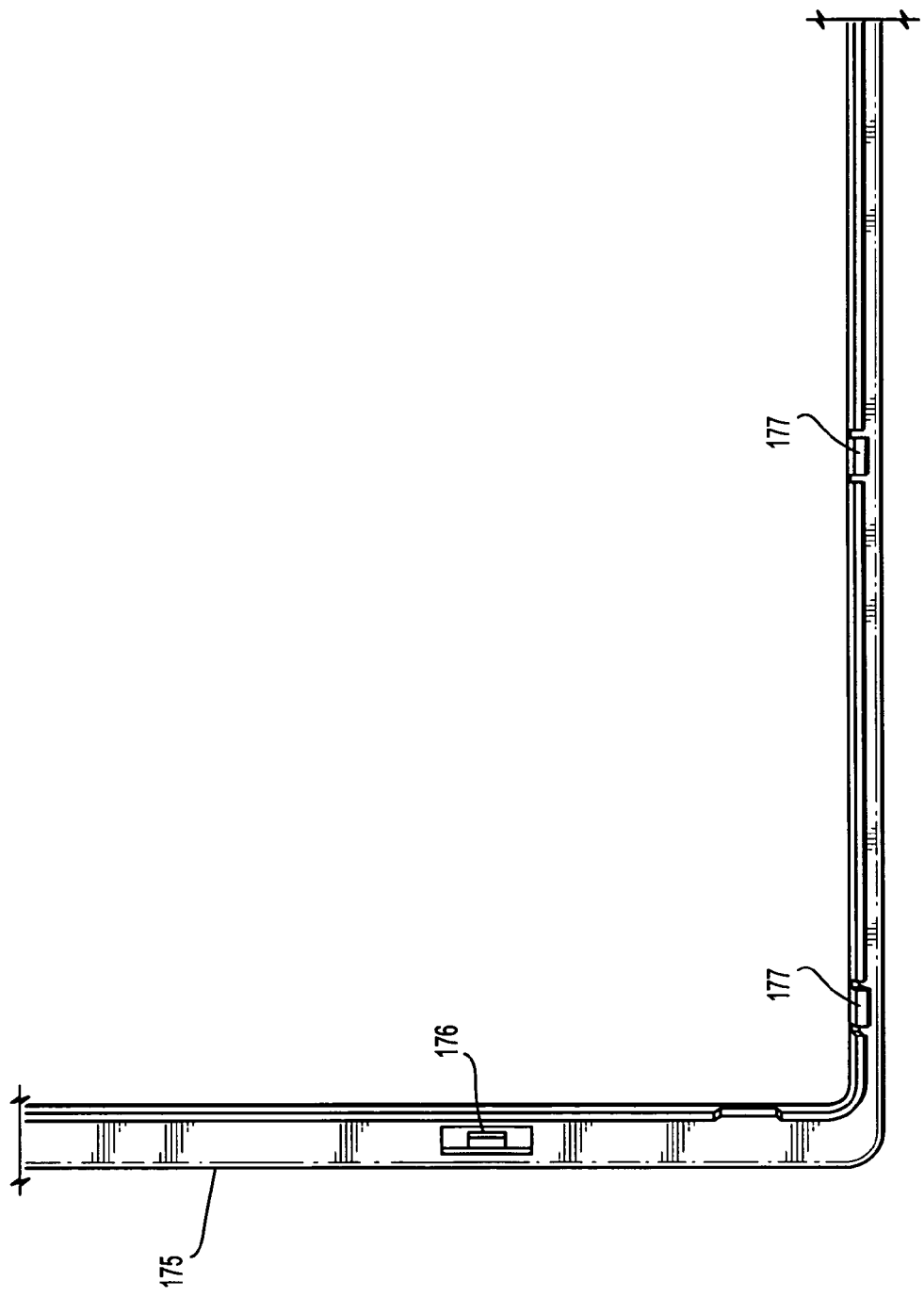

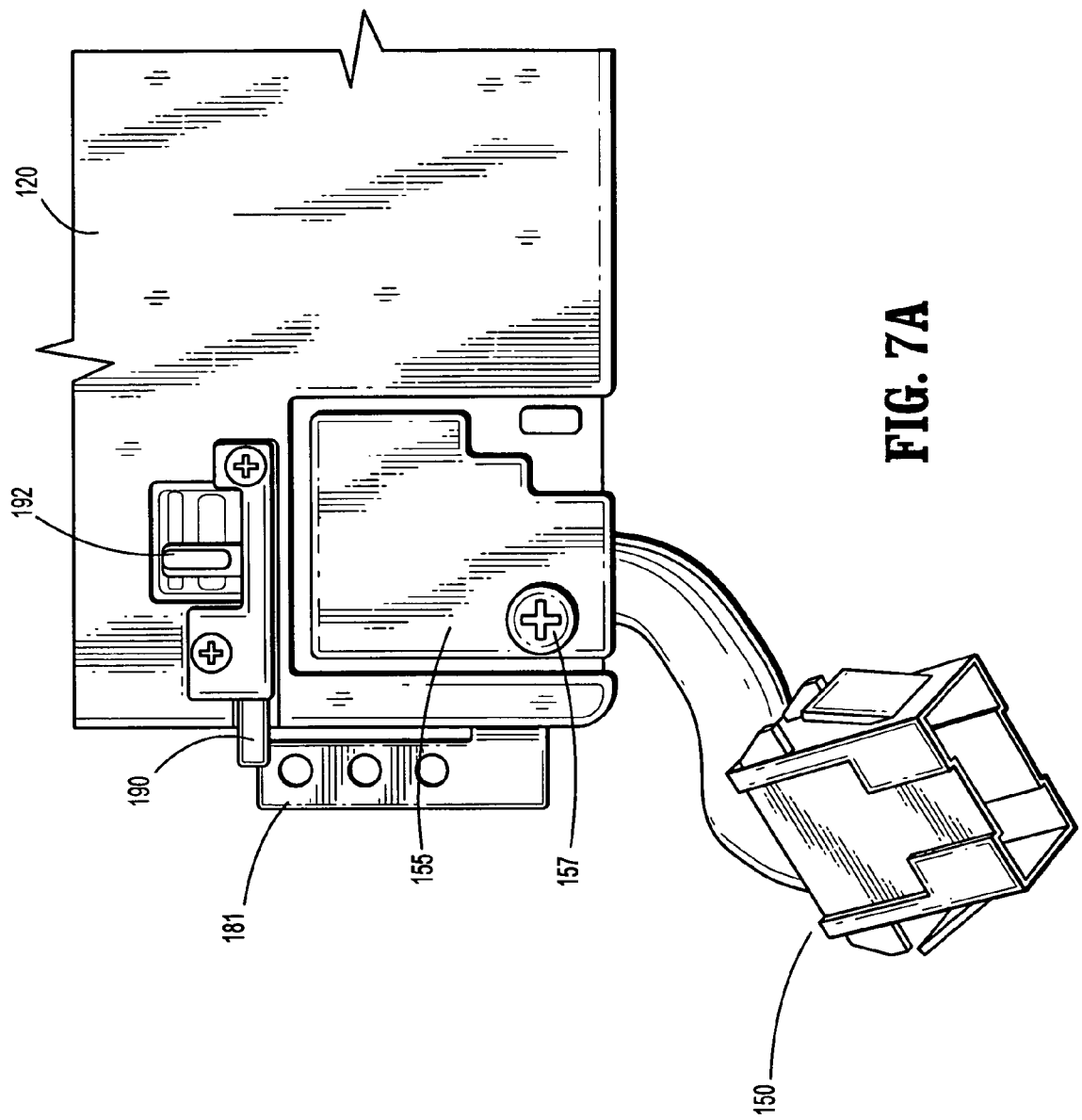

ENTERTAINMENT SYSTEM MOUNTABLE IN A VEHICLE SEAT

CROSS-REFERENCE TO RELATED APPLICATIONS

This application claims priority to U.S. Provisional Application Ser. No. 60/734,329 filed Nov. 7, 2005, the contents of which are hereby incorporated by reference herein in their entirety. This application is also a CIP of U.S. application Ser. No. 11/072,171, filed Mar. 4, 2005, which is a CIP of U.S. application Ser. No. 10/438,724, filed on May 15, 2003 now U.S. Pat. No. 7,245,274, the contents of which are hereby incorporated by reference herein in their entirety.

TECHNICAL FIELD

The present invention relates to an entertainment system, and more particularly to an entertainment system capable of being mounted in a seat (e.g. headrest) of a vehicle.

DISCUSSION OF THE RELATED ART

As society becomes more mobile and therefore spends a greater amount of time traveling and away from home, demand rises for electronic appliances and devices outside the home environment. For example, video screens have been mounted in the headrests of vehicles, facilitating video entertainment on the road. These video screens are connected to video players located, for example, in the glove box of the vehicle. However, the video player and video screen cannot be removed from the vehicle. Thus, videos may only be viewed with such systems when occupying the vehicle. In addition, there is also a risk of theft of the video screen and video player and corresponding damage to the vehicle when the vehicle is unattended. Further, a video screen and player that is not removable is difficult to replace or service.

Therefore, a need exists for a video system which is easily removable from a headrest.

SUMMARY OF THE INVENTION

In accordance with an embodiment of the present invention, an entertainment system for a seat of a vehicle is provided. The entertainment system includes a housing adapted for being mounted within a seat of a vehicle and a media unit housed within the housing and pivotably coupled to the housing. The housing includes a groove formed within a sidewall of the housing adapted to engage a movable latch of the media unit.

In accordance with an embodiment of the present invention, an entertainment system mounted in a headrest of a seat of a vehicle is provided. The entertainment system includes a media unit housing mounted within the headrest. The housing having a first sidewall, second sidewall, third sidewall and fourth sidewall and a face. The first and second sidewalls being connected to each other via the third and fourth sidewalls, and the first, second, third and fourth sidewalls each being substantially perpendicular to the face, and wherein the housing includes a pair of first flexible members provided on the second sidewall of the housing. In addition, the entertainment system includes a media unit housed within the housing and pivotably coupled to the housing, wherein the first flexible members snap over a pair of tabs located on a surface of the media unit to hold the media unit in place within the housing.

In accordance with an embodiment of the present invention, a support structure for supporting an entertainment system within a seat of a vehicle is provided. The support structure includes a housing adapted for being mounted within the seat of a vehicle and for pivotably housing a media unit therein. Moreover, the housing includes first biased members disposed within a face of the housing to provide a force on the media unit in a direction away from the housing.

In accordance with an embodiment of the present invention, an electrical connection assembly for electrically connecting a media unit housed within a seat of a vehicle to wire leads running through the seat of the vehicle is provided. The electrical connection assembly includes an electrical connector having first and second opposing pin connectors, a first mating pin connector positioned in the seat of the vehicle, and a second mating pin connector positioned in the media unit. The first opposing pin connector connects to the first mating pin connector and the second opposing pin connector connects to the second mating pin connector.

In accordance with an embodiment of the present invention, an entertainment system for a seat of a vehicle is provided. The entertainment system includes a housing adapted for being mounted within a seat of a vehicle and a media unit housed within the housing and pivotably coupled to the housing. The housing includes at least one of a groove formed within a sidewall of the housing adapted to engage a movable latch of the media unit, a first flexible member provided on a sidewall of the housing to engage a portion of the media unit for snapping the media unit into place within the housing, or a second flexible member disposed in a face of the housing to provide a spring force on the media unit in a direction away from the housing.

BRIEF DESCRIPTION OF THE DRAWINGS

Embodiments of the present invention will be described below in more detail, with reference to the accompanying drawings:

FIGS. 1F-1H show sides views of the entertainment system of FIG. 1A with the media unit pivoted outward with respect to the housing, according to an embodiment of the present invention;

FIGS. 2A and 2B show front views of the entertainment system including the media unit coupled to the housing, according to an embodiment of the present invention;

FIG. 3C shows a close-up view of the tab of FIG. 3A in the retracted position, according to an embodiment of the present invention;

FIG. 5E shows a close-up front view of recesses for receiving fixing devices for fixing the hinge portion of FIGS. 5C-5D to the housing, according to an embodiment of the present invention;

FIG. 6E shows a close-up rear view of part of the trim portion, according to an embodiment of the present invention;

FIGS. 7A-7B show an electrical connector running from the media unit, according to an embodiment of the present invention;

DETAILED DESCRIPTION OF THE EMBODIMENTS

Figure 1A:
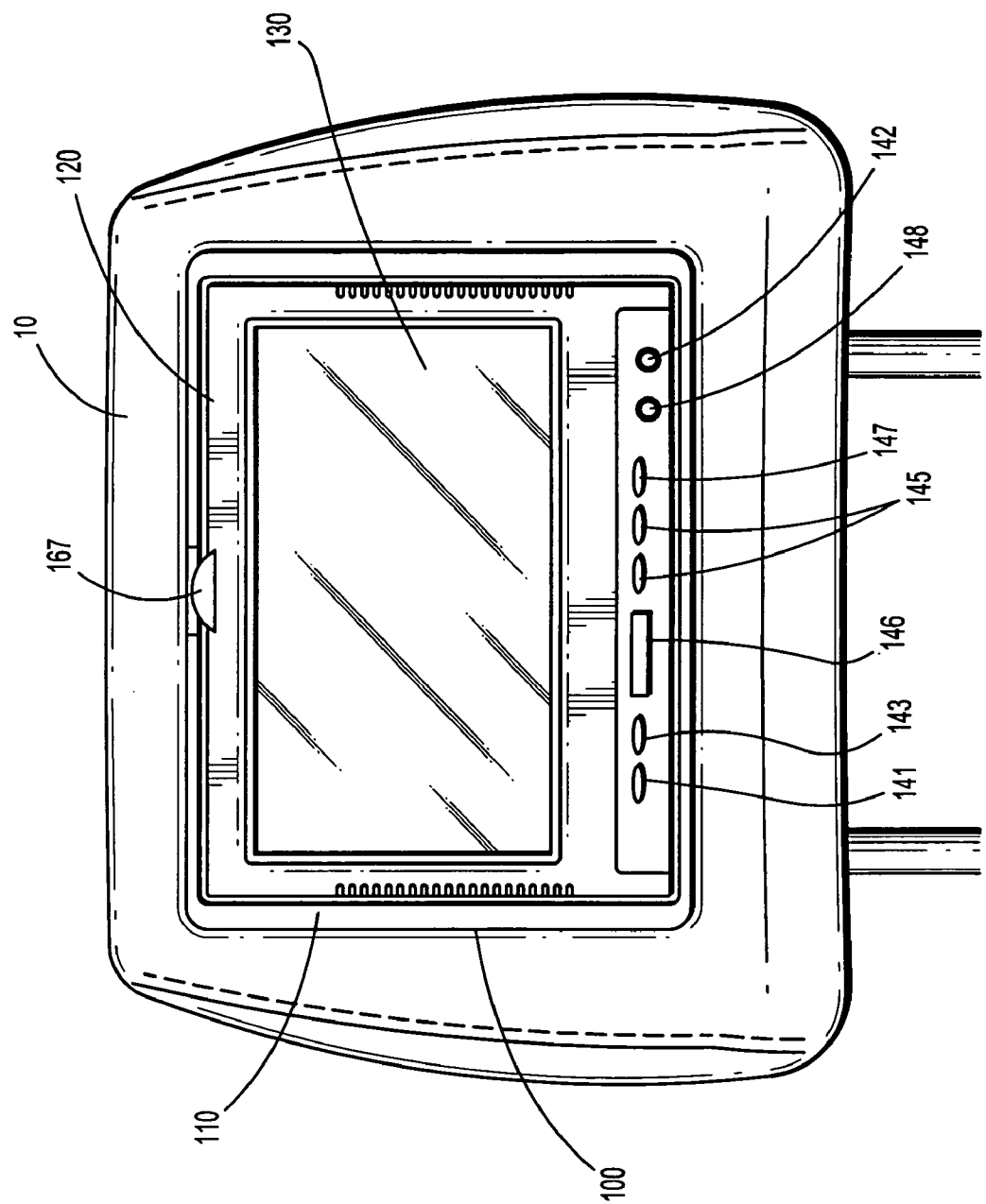
FIG. 1A shows a front view of an entertainment system including a media unit coupled to a housing mounted in a headrest, according to an embodiment of the present invention.
Figure 1B:
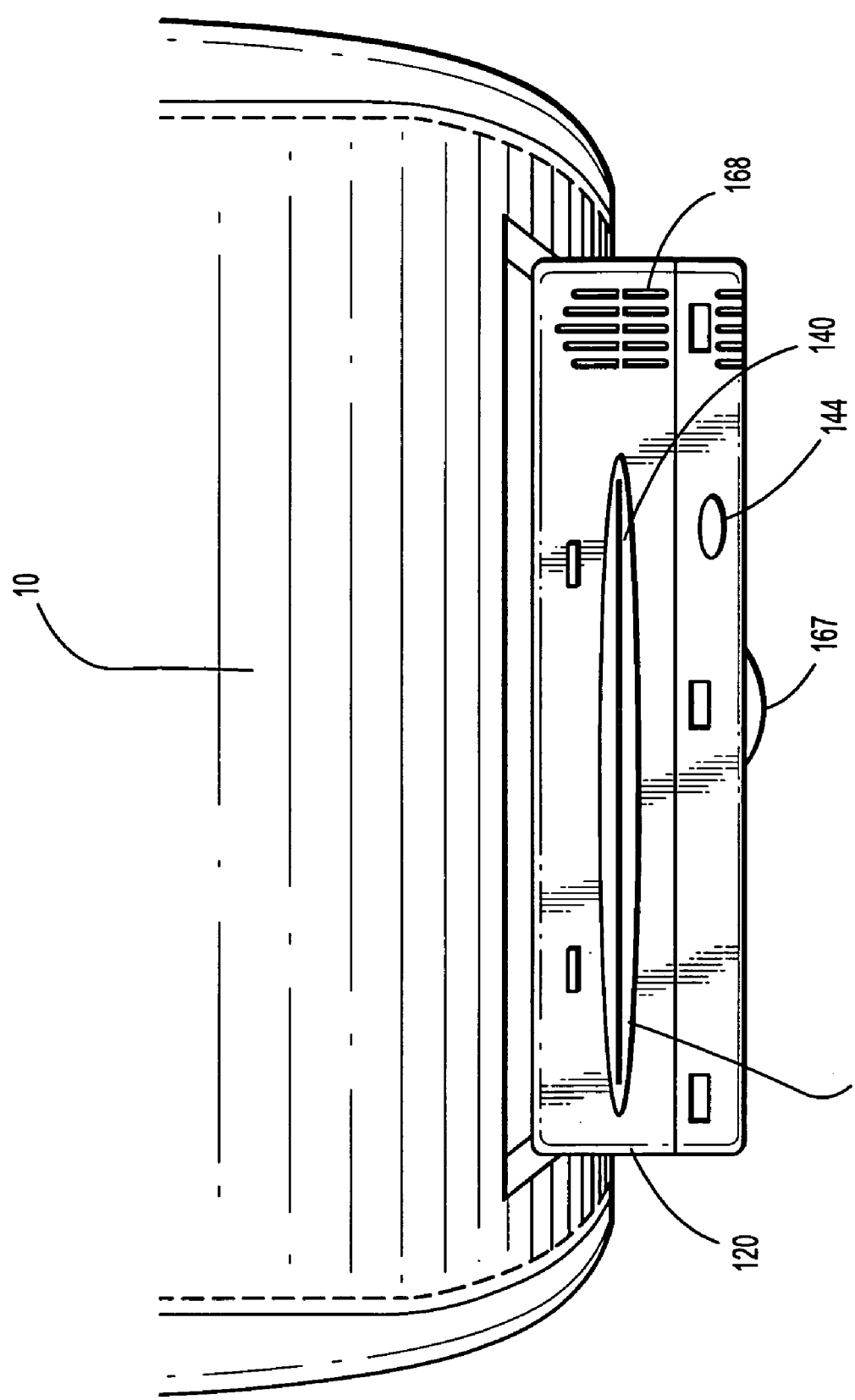
FIGS. 1B and 1D show top views of the entertainment system of FIG. 1A with the media unit pivoted outward with respect to the housing, according to an embodiment of the present invention.
Figure 1C:
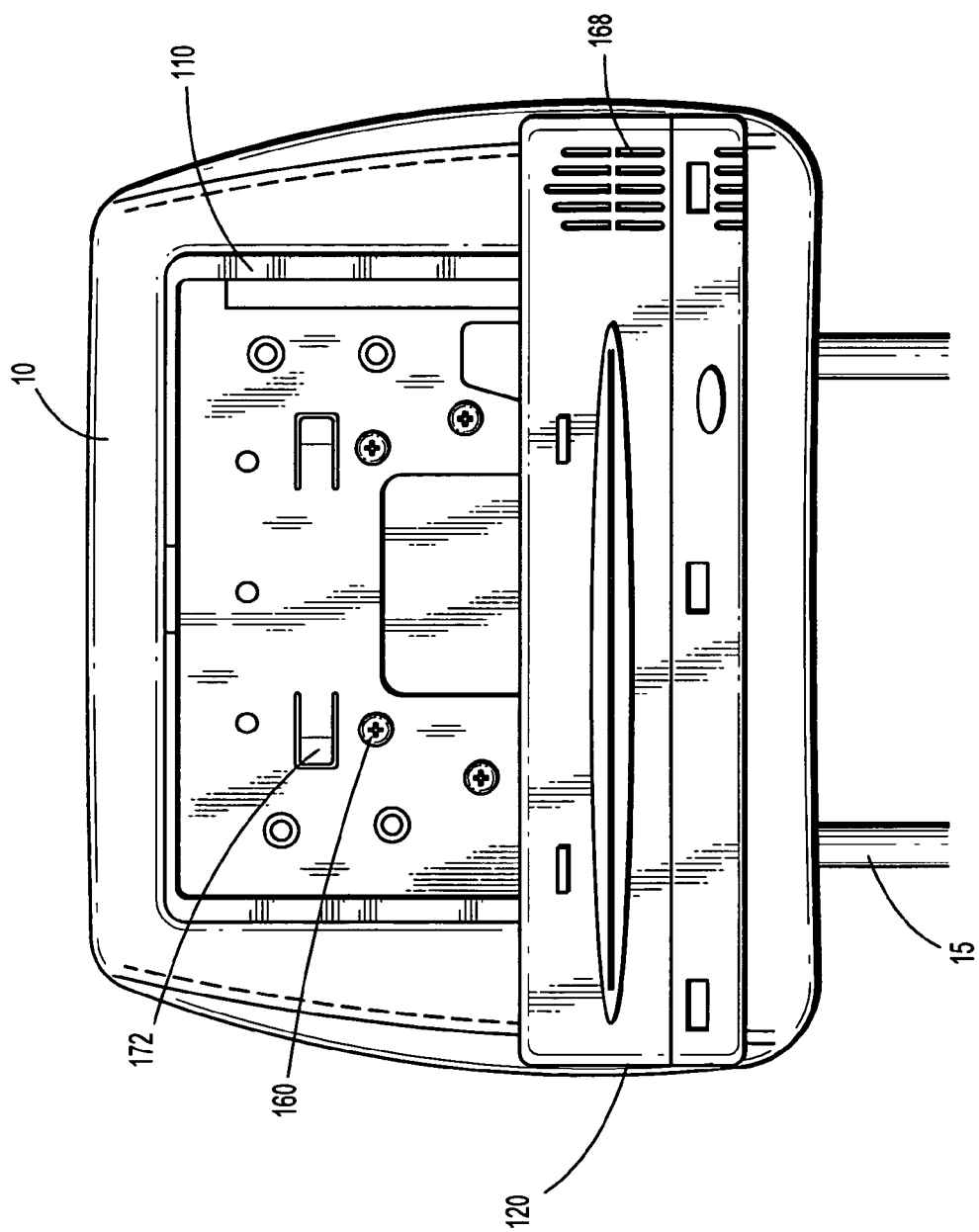
FIGS. 1C and 1E show front views of the entertainment system of FIG. 1A with the media unit pivoted outward with respect to the housing, according to an embodiment of the present invention.
Figure 1D:
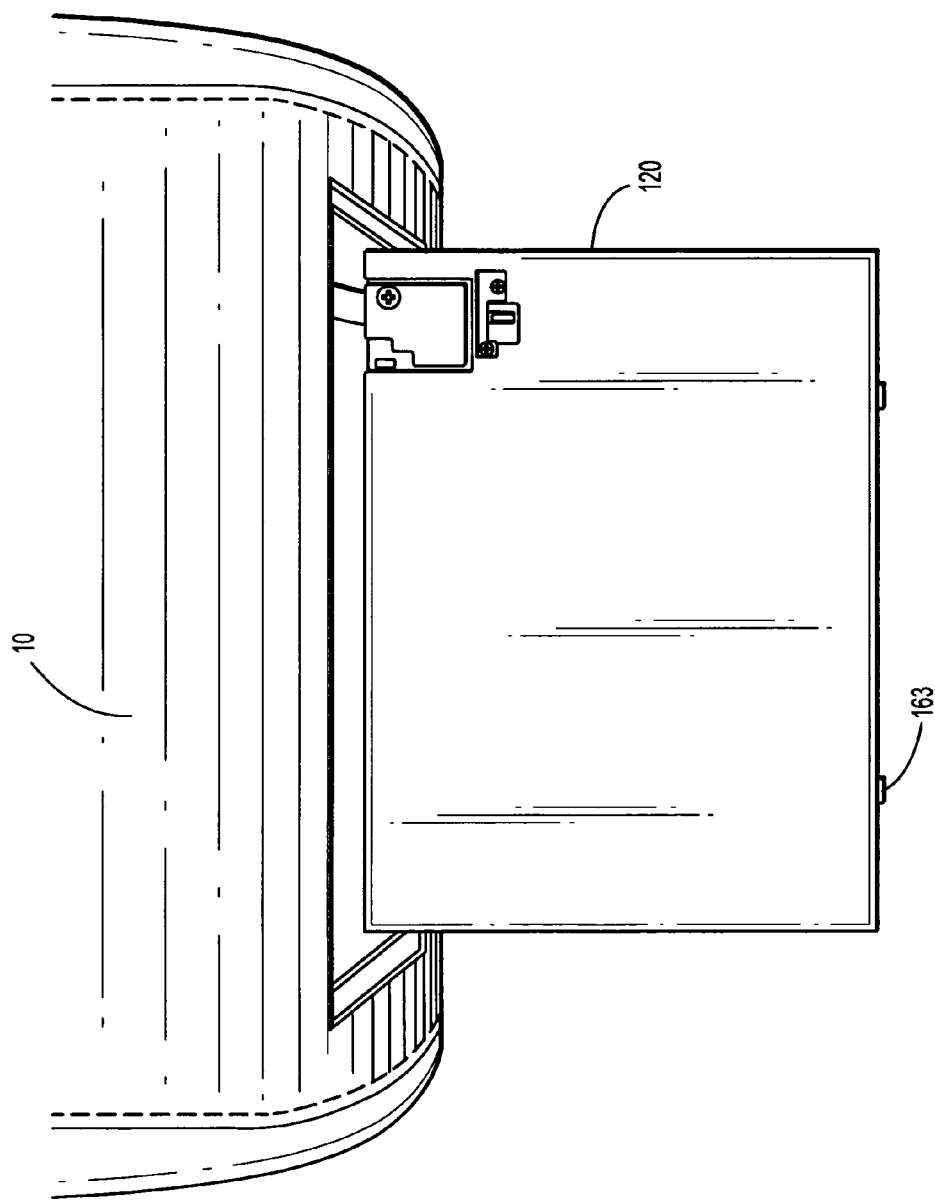

Disclosed is an entertainment system capable of being mounted in a seat of a vehicle. For example, the entertainment system includes a housing mounted in a headrest of a seat of a vehicle, such as, for example, an automobile, minivan or sport utility vehicle (SUV). The housing may also be mounted in a body of a vehicle seat. The entertainment system further includes a media unit that is pivotably coupled to the housing.

Referring to FIGS. 1A-1H and 2A-2H, a headrest 10 includes an entertainment system 100 mounted therein. The entertainment system 100 includes a housing 110 and a media unit 120, which is coupled to the housing 110. Moreover, the media unit 120 includes a display 130 having a screen for displaying video. The screen is preferably an LCD type display, but may be another type of display, such as, for example, an organic LED or electro-luminescent display.

In one embodiment, an LCD simultaneously displays different content in right and left viewing directions by directionally controlling the viewing angle of the LCD. In other words, one passenger can see a program from a first media source from a right side of the display, while another can see a program from a second media source from the left side of the display. The simultaneous display of different content on the display (e.g., display 130), is accomplished by superimposing a parallax barrier on a thin film transistor (TFT) LCD to enable light from a backlight to separate into right and left directions.

In the present exemplary embodiment, video is supplied from a media source, for example, a DVD player 140 provided behind the display 130. The media source may also be, for example, a CD-ROM player, a video game player, a videocassette player, a television tuner, a radio tuner, a wireless receiver, an MP3 player, a digital video recorder (DVR), a device for playing media supplied from a portable storage device (e.g., a portable hard drive, memory cards, flash memory sticks, key drives, thumb drives) and/or a device for playing media supplied from a portable media player, such as for example, an audio or video ipod®. The media unit 120 may include a memory device, for example, a DVR, which receives and stores video programming, and hardware for playing such programming. Alternatively, the display 130 can be electrically connected to an auxiliary media source through auxiliary port 142.

In another alternative, the display 130 is electrically connected to a media source, for example, another DVD player in another headrest, via a wired connection running from the media unit 120. Referring to FIGS. 2B, 2D, 2F and 7A-7D, the wired connection running from the media unit 120 preferably includes a two-headed electrical connector 150, including, for example, pin connectors 151 and 152. The pin connector 151 connects to a mating pin connector 153 positioned in the headrest 10 (see FIGS. 4A-4B), which is, in turn, connected to wire leads running through the headrest support rods 15 to connect to a wire harness or a distribution box (not shown). By unplugging the pin connectors 151, 153 from each other, a user is able to remove the media unit 120 from the headrest 10 without cutting or pulling apart the wires. The pin connector 152 connects to a mating pin connector 154 positioned in the media unit 120.

Referring to FIGS. 7A-7F, the electrical connector 150 is positioned at a rear portion of the media unit 120, with pin connector 152 connected to pin connector 154. Connector 150 is held in place by cover 155, which includes a hole 156 for receiving a fixing device, such as, for example, a screw 157, and tabs 158 for fitting into slots 159 on the media unit 120. Referring to FIGS. 2D, 5E and 6A-6C, the housing 110 includes opening 169 through which wires (e.g., connector 150) can be fed.

The wired connection preferably carries, for example, power, ground, and audio/video inputs and outputs. For example, video from DVD player 140 may be supplied via the wired connection, including electrical connector 150 and connectors 151-154, to a display located in another headrest of the vehicle. The wired connection may also carry control signals for a wireless FM modulator for supplying wireless audio to a vehicle sound system or to wireless headphones.

Referring to FIGS. 1A, 2A, 2B and 5A, the front face of the media unit 120 includes a plurality of control buttons, for example, a power button 141, a screen mode button 143 for controlling aspect ratio, play and stop buttons 145 for controlling play of a video program and a source button 147 for controlling the source of a program (e.g., DVD or auxiliary input). Depending on the selected sources for each media unit, multiple displays in multiple headrests may simultaneously play the same or different programs. The media unit 120 also includes an infrared transmitter and receiver 146 for transmitting, for example, wireless audio signals to wireless headphones, and for receiving remote control signals. A headphone jack 148 is also positioned on the front face of the media unit 120.

The media unit 120 includes slits 168 formed in the body thereof, creating openings to facilitate ventilation and the passage of sound from, for example, a speaker (not shown) provided in the body of the media unit 120.

Figure 4A:
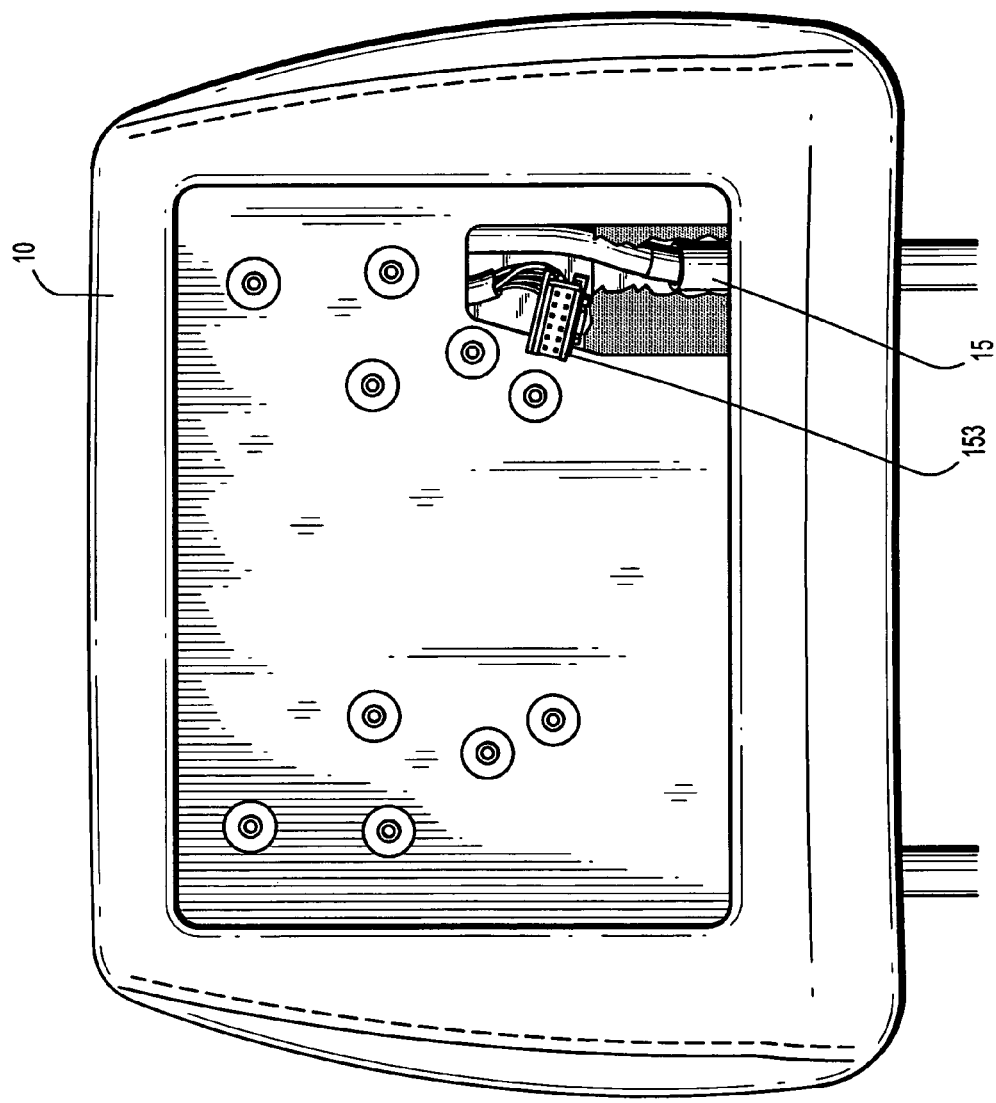
FIG. 4A shows a front view of a headrest including a wired connection, according to an embodiment of the present invention.
Figure 4B:
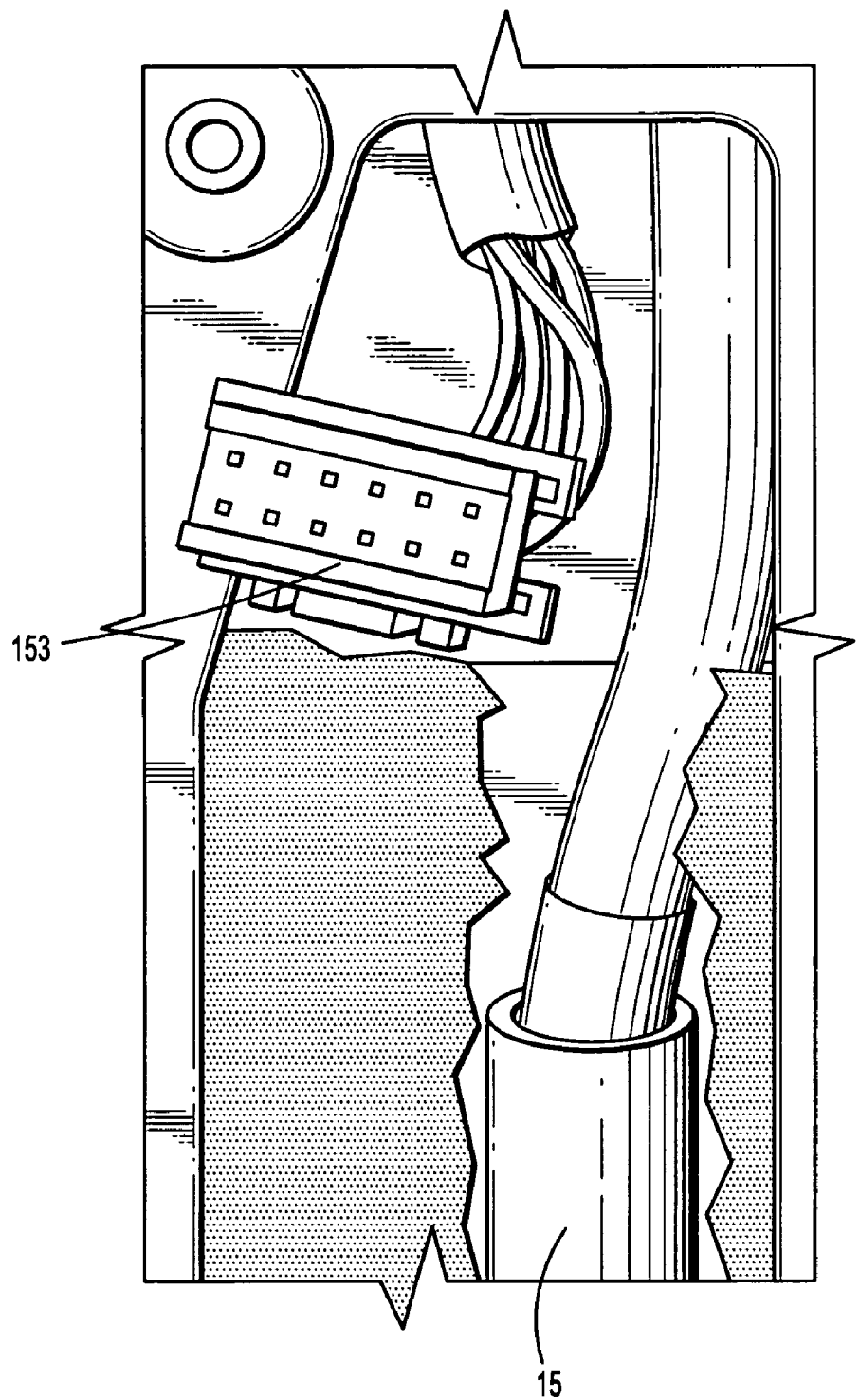
FIG. 4B shows a close-up view of the wired connection shown in FIG. 4A, according to an embodiment of the present invention.

Referring to FIGS. 2C, 2D, 6A, 6B and 6D, the housing 110 includes a plurality of recesses 160 for receiving fixing devices, such as screws 161 for mounting the housing 110 to a rigid portion of the headrest 10 (see FIG. 4A). Referring to FIGS. 2C, 2E and 6A-6B; the housing 110 also includes a plurality of flexible members 162, which flex upward by pressure from tabs 163 (see FIG. 1D) when the media unit 120 is pivoted into the housing 110. Once the tabs 163 pass the flexible members 162, the flexible members flex back downward to hold the media unit 120 in place. When the media unit 120 is pivoted out of the housing (see, e.g., FIGS. 1B-1C), the members 162 flex back upward similar to when the media unit 120 is pivoted into the housing 110 to allow the media unit 120 to freely rotate. The above-mentioned engagement between the flexible members 162 and the tabs 163 allows for the media unit 120 to be readily snapped into and/or removed from the housing 110 of the entertainment system without the use of any fasteners, such as, for example, screws, bolts, nails, tools, or the like. Thus, the exemplary embodiments of the present invention allow for the media unit 120 to be installed and/or removed with very little effort, which in turn saves on installation time and avoids having to return the whole headrest but rather only the media unit 120 itself, if the media unit 120 needs to be repaired.

As shown in FIGS. 1A, 1B, 2A, 2B, 2E and 5A, the media unit 120 includes a tab 167 that can be gripped by a user to pull the media unit 120 out from a secured position in the housing 110. The tab 167 is positioned at a top center portion of the front face of the media unit 120.

Referring to FIGS. 1C, 1E, 2C, 2D, 6A, 6B and 6D, the housing 110 includes flexible members 172 provided within for example, a front face of the housing, which flex toward the vehicle seat when the media unit 120 is pivoted into the housing 110 and held in place by the flexible members 162. When the media unit 120 is pivoted out of the housing (see e.g., FIGS. 1B-1C), the members 172 flex away from the seat to provide a spring force on the media unit 120 to facilitate rotation of the media unit 120 away from the housing 110.

Referring to FIGS. 5A, 5B, 6A and 6E, the housing 110 includes a trim portion 175, which is removed from and coupled to the housing by manipulating snap-fit mechanisms. For example, the trim portion 175 includes tabs 176 and 177, which snap-fit into recesses 178 and 179, respectively. The trim portion 175 and the media unit 120 may be provided in different colors to fit with various interior color schemes of a vehicle.

Figure 5A:
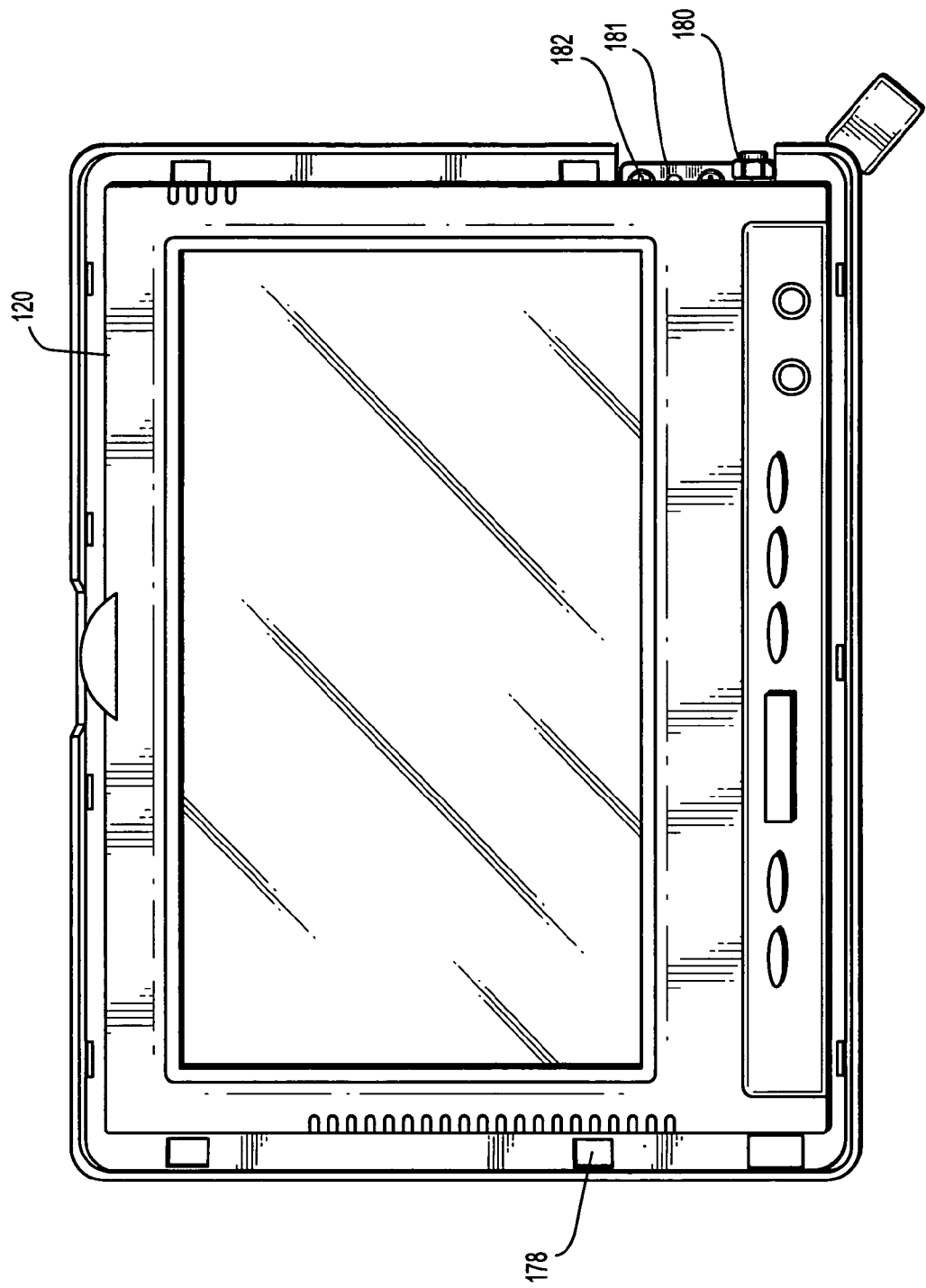
FIG. 5A shows a front view of the entertainment system including the media unit coupled to the housing, with a trim portion removed from the housing, according to an embodiment of the present invention.
Figure 5B:
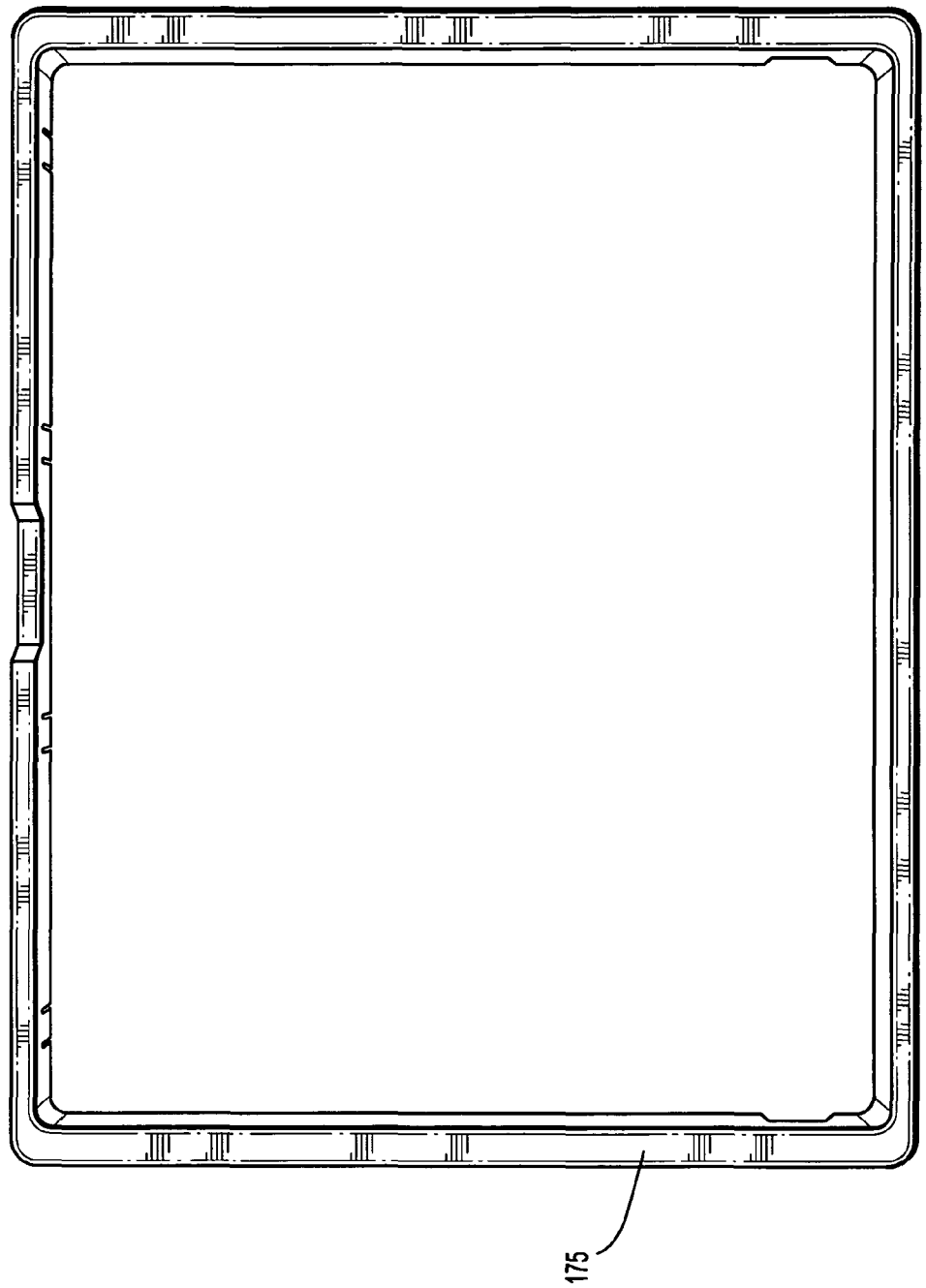
FIG. 5B shows a front view of the trim portion referred to in the description of FIG. 5A, according to an embodiment of the present invention.
Figure 5C:
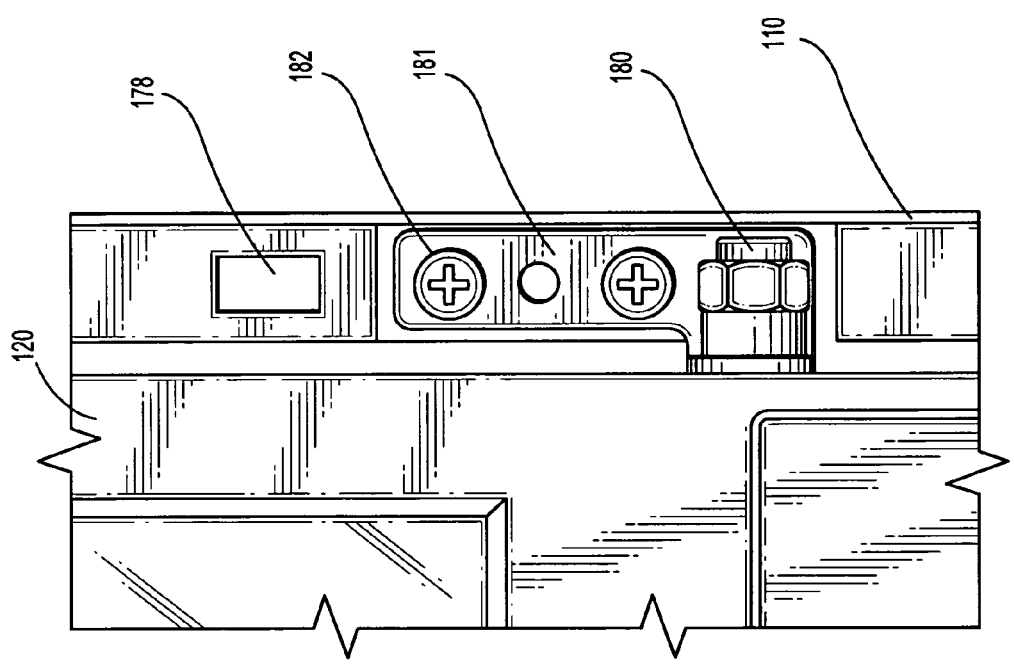
FIG. 5C shows a close-up front view of a hinge portion coupling the media unit to the housing, according to an embodiment of the present invention.
Figure 5D:
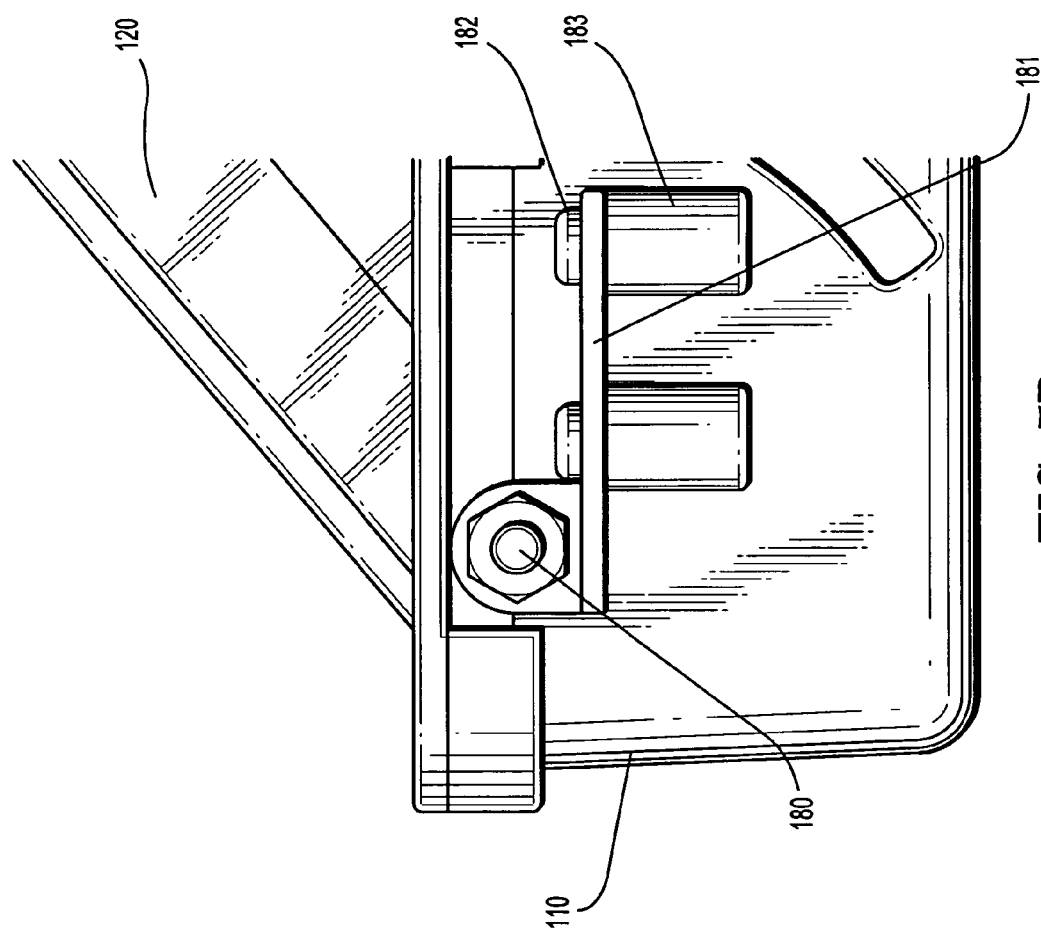
FIG. 5D shows a close-up side view of a hinge portion coupling the media unit to the housing, according to an embodiment of the present invention.
Figure 5F:
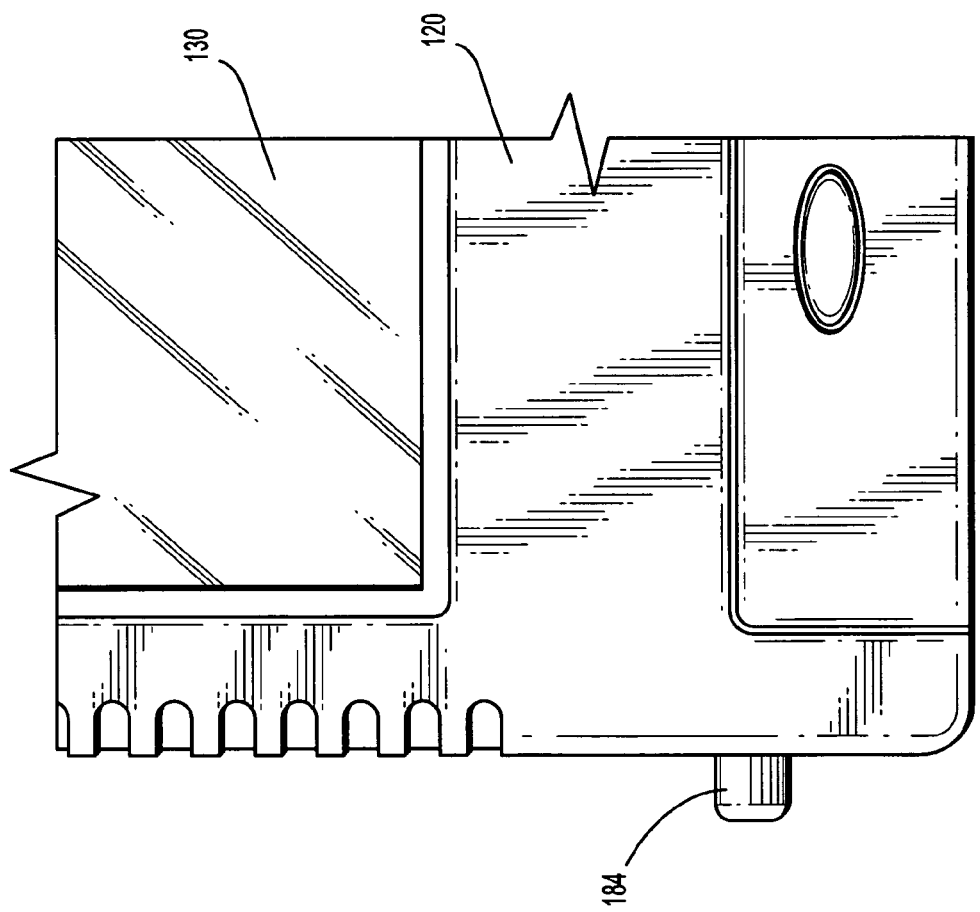
FIG. 5F shows a close-up front view of another hinge portion coupling the media unit to the housing, according to an embodiment of the present invention.
Figure 5G:
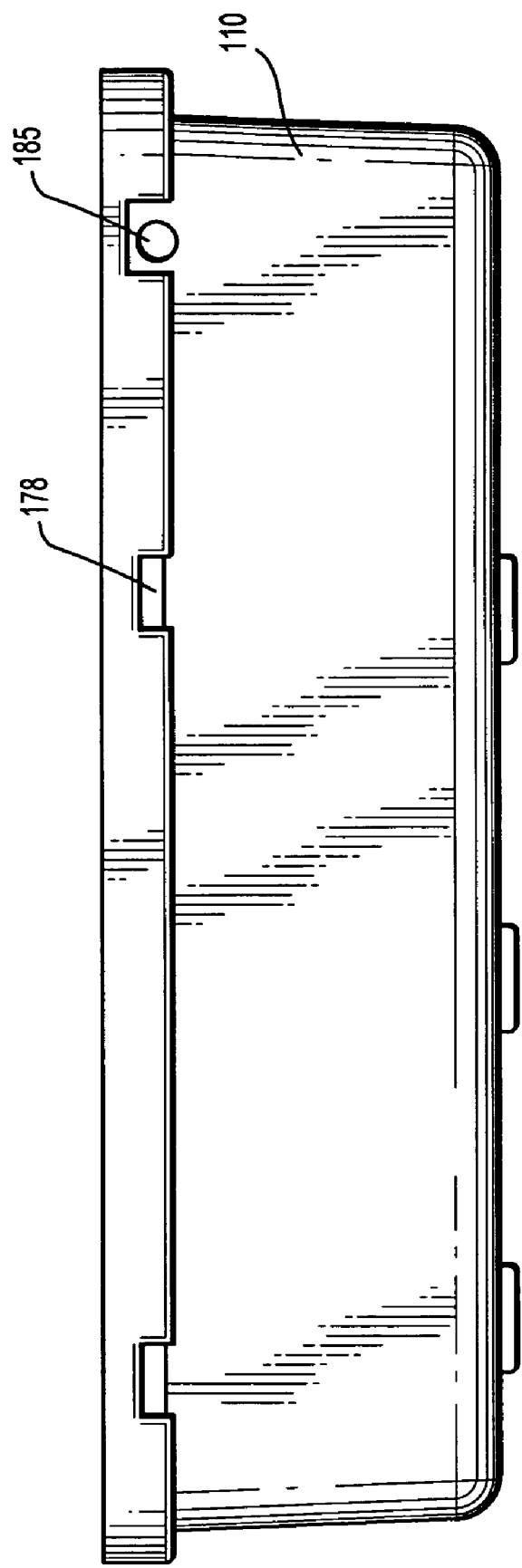
FIG. 5G shows a side view of the housing including a recess for receiving the hinge portion of FIG. 5F, according to an embodiment of the present invention.
Figure 6A:
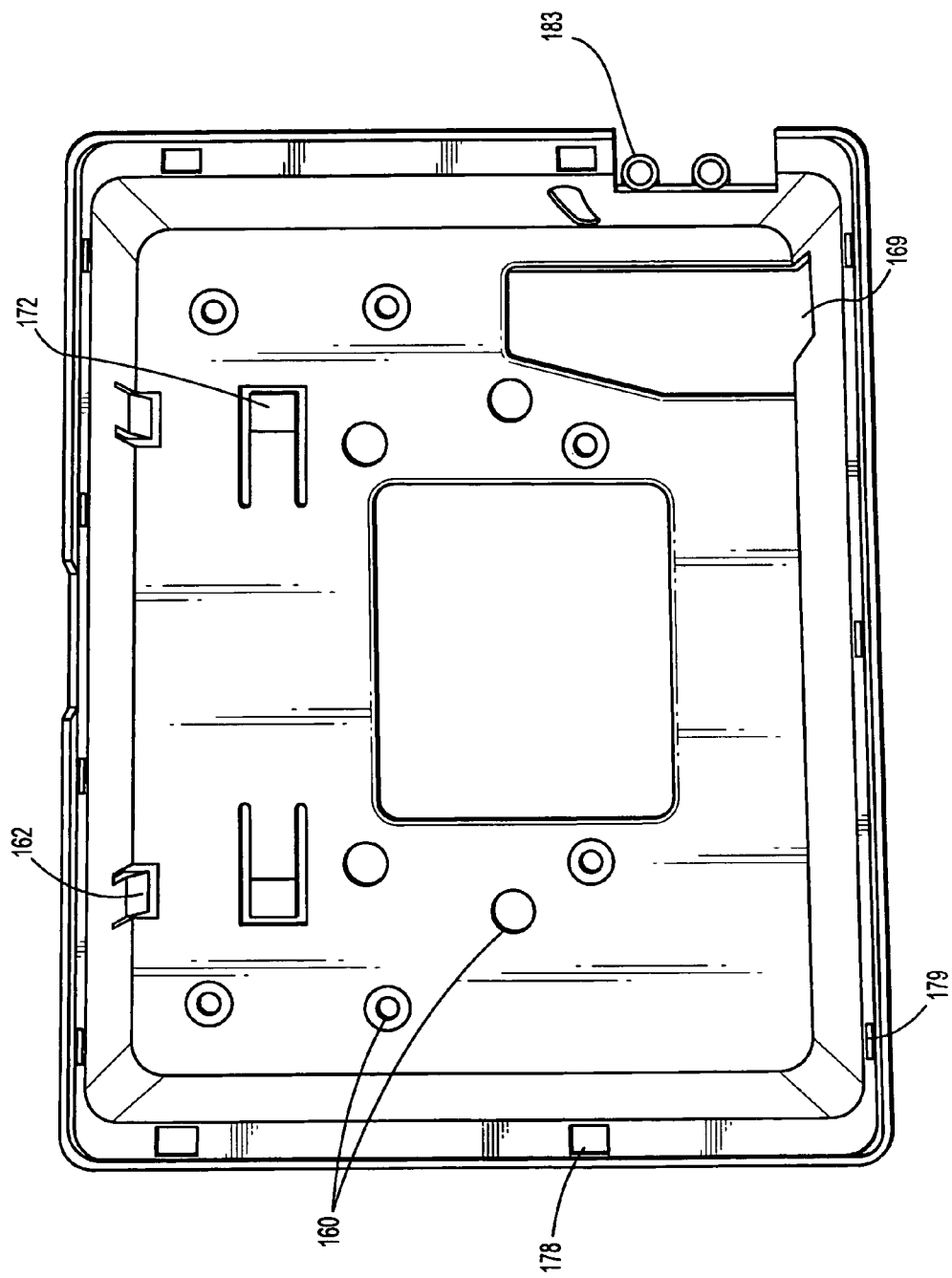
FIG. 6A shows a front view of the housing, according to an embodiment of the present invention.
Figure 6B:
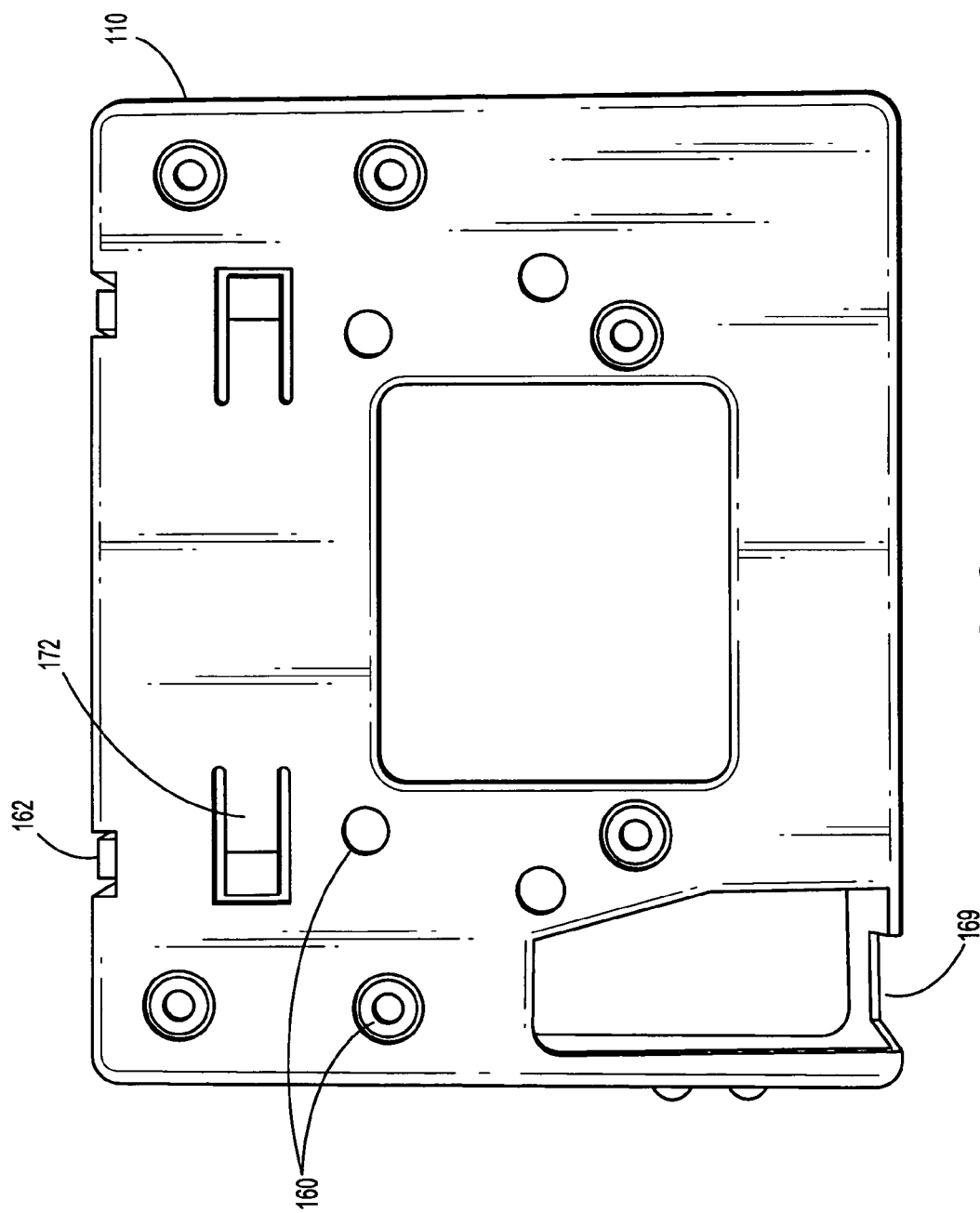
FIG. 6B shows a rear view of the housing, according to an embodiment of the present invention.
Figure 6C:
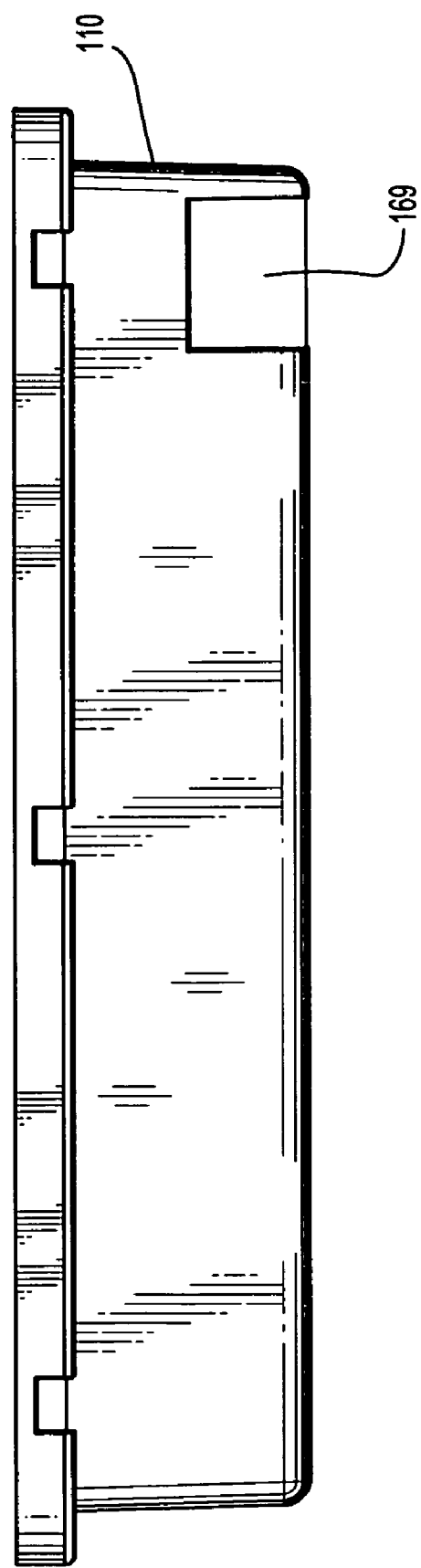
FIG. 6C shows a bottom view of the housing, according to an embodiment of the present invention.
Figure 6D:
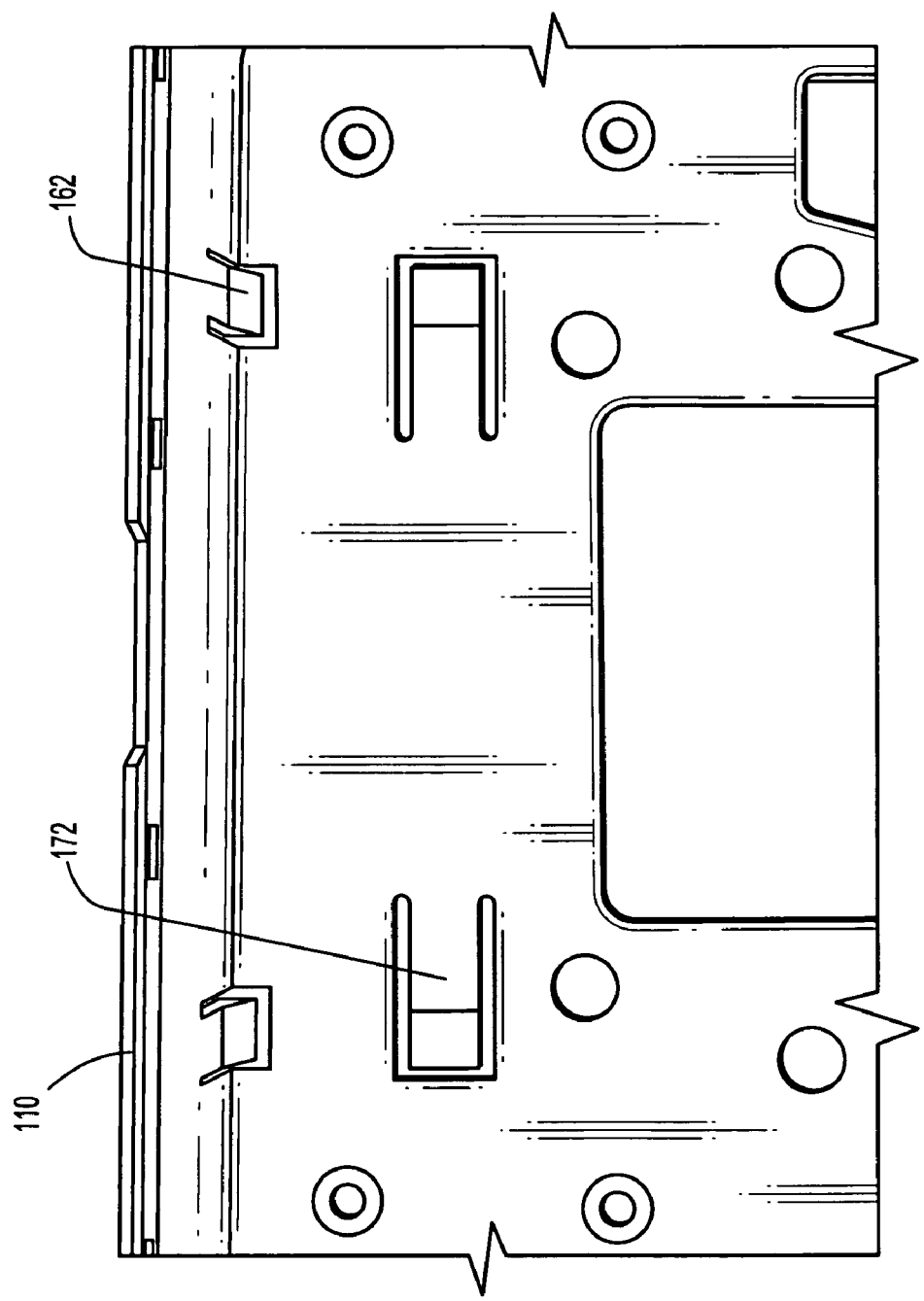
FIG. 6D shows a close-up front view of part of the housing, according to an embodiment of the present invention.
Figure 7B:
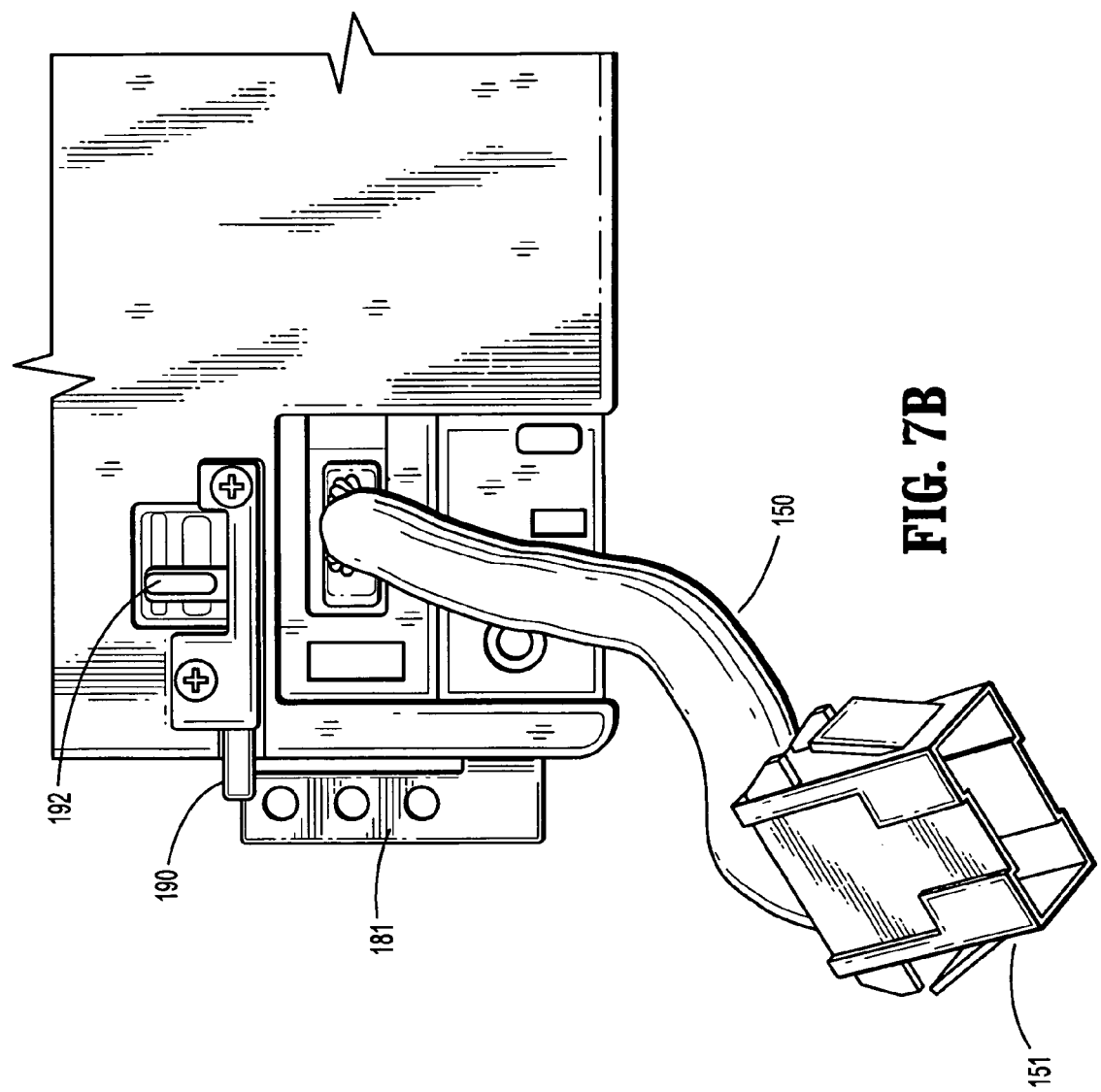
Figure 7C:
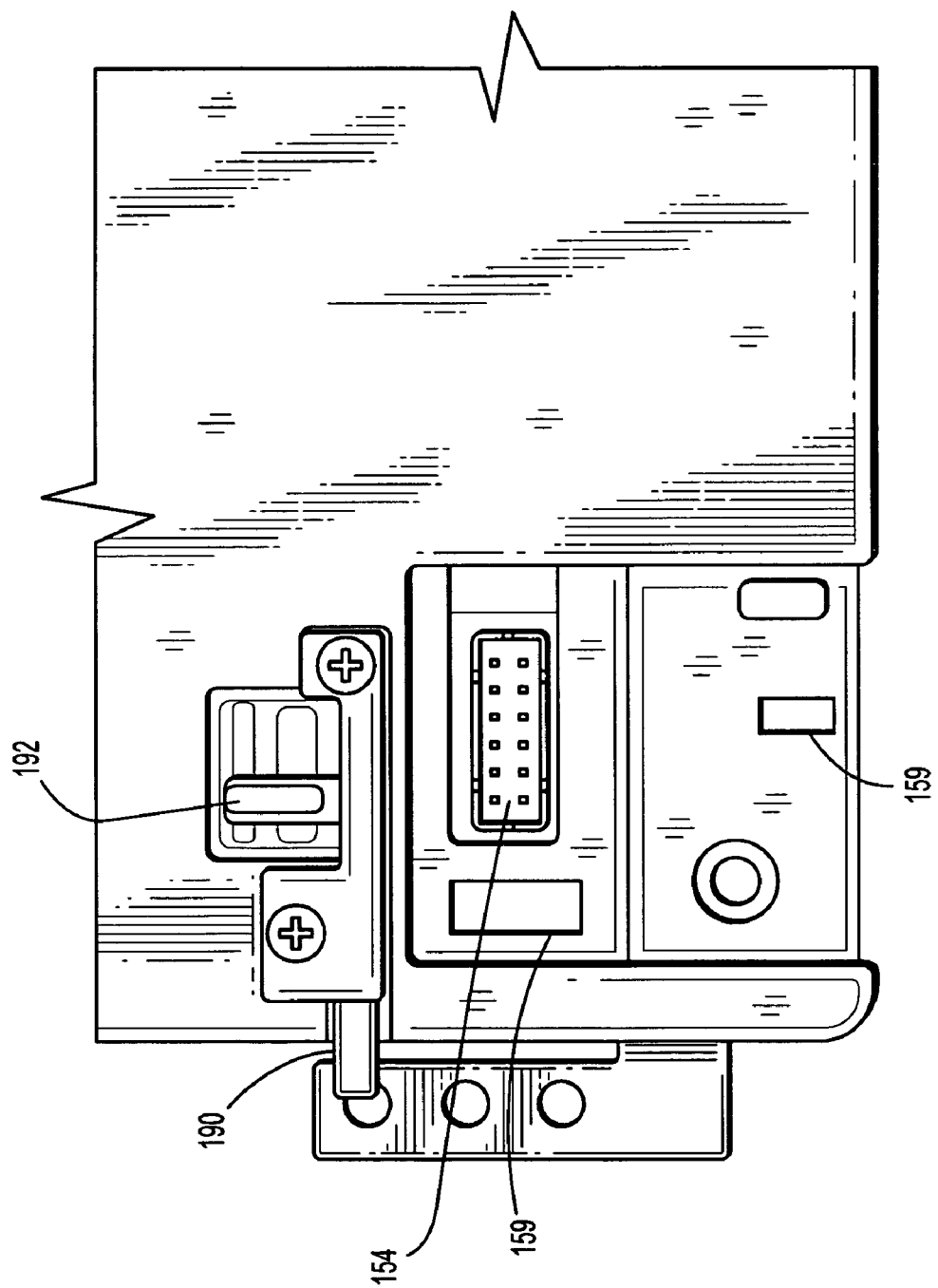
FIG. 7C shows a connector positioned in the media unit for receiving the electrical connector shown in FIG. 7D, according to an embodiment of the present invention.
Figure 7D:
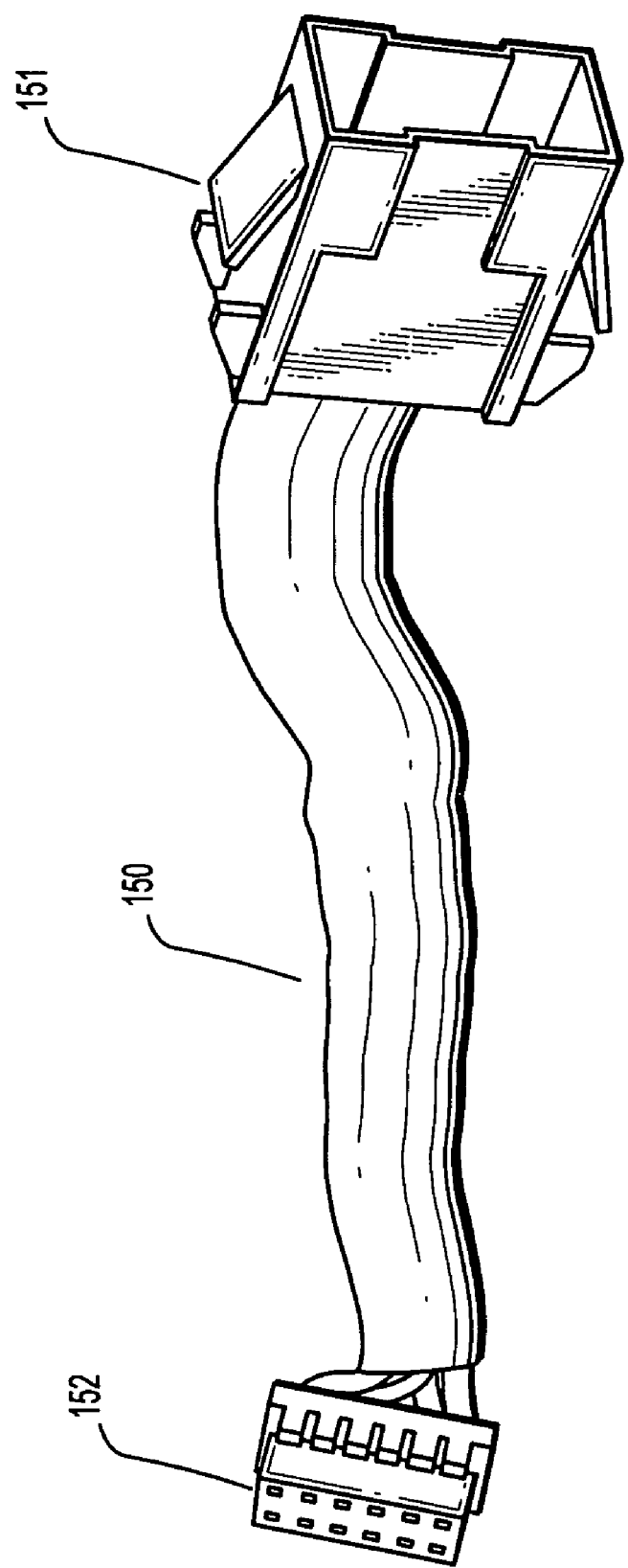
FIG. 7D shows an electrical connector, according to an embodiment of the present invention.
Figure 7E:
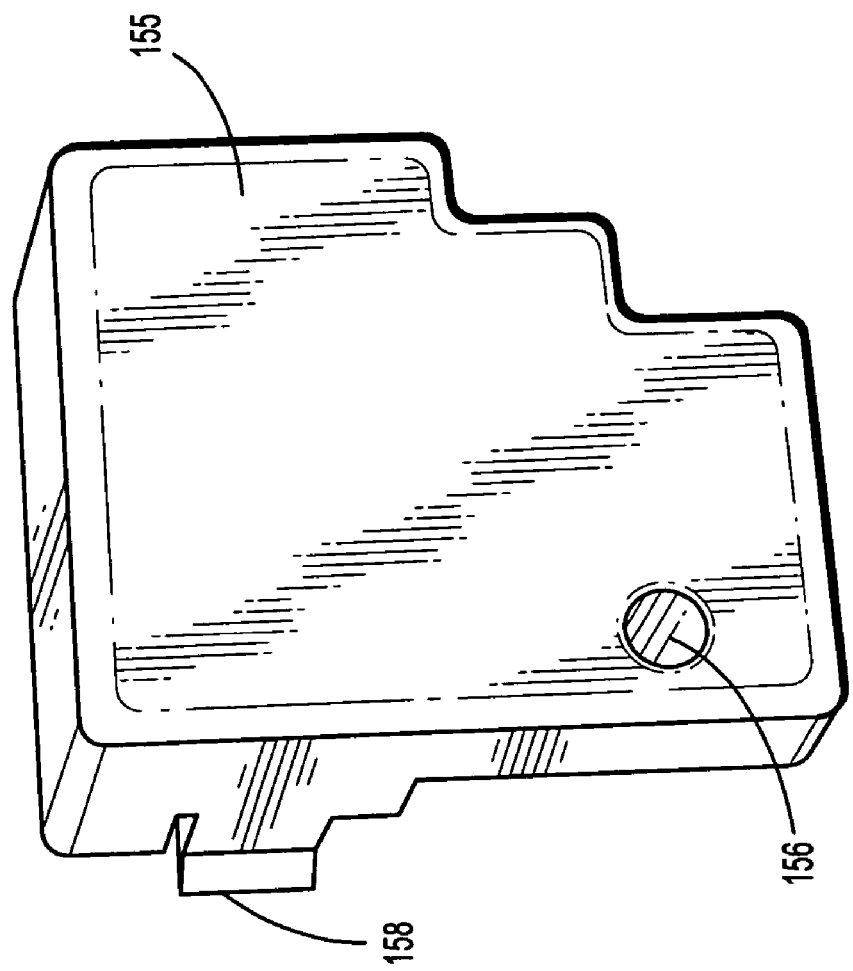
FIGS. 7E-7F show a cover for holding the electrical connector shown in FIG. 7D in place on the media unit, according to an embodiment of the present invention.
Figure 7F:
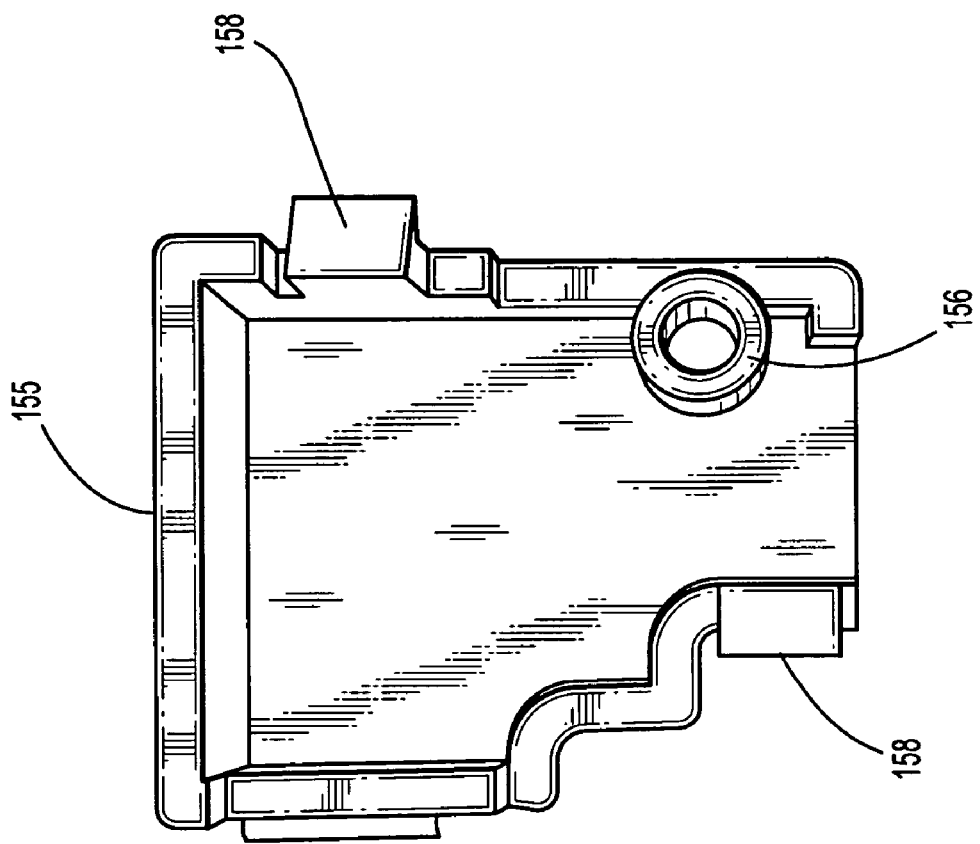

Referring to FIG. 5A, when the trim portion 175 is removed, a user/installer is able to access a part of the housing 110 to which a hinge portion 180 is coupled. As shown in FIGS. 5C-5E, the hinge portion 180 includes a plate 181, through which fixing devices, such as, for example, screws 182, are driven into recesses 183 formed in the housing 110. Referring to FIGS. 5F-5G, a second hinge portion 184, formed on a side of the media unit 120 opposite to the side on which the hinge portion 180 is formed, fits into a recess 185 formed in the housing 110. As a result, the media unit 120 is coupled to the housing 110 via hinge portions 180 and 184.

As shown in FIGS. 1B-1H, 2C and 2H, the media unit 120 can be pivoted outward with respect to the housing 110 to adjust a viewing angle of the display 130 and to provide access to a media source 140 to insert or remove a media storage medium, such as, for example, a DVD. The media storage medium insertion point 149 and control buttons 144 for the media source 140, such as, for example, an "eject" button, can be located on a top side of the media unit 120.

The hinge arrangement permits rotation of the media unit with respect to the housing in the range of approximately 0° to approximately 135°. Alternative hinges known to those of ordinary skill in the art may be used and the angle range of rotation may be varied to be greater or smaller depending on design preferences.

Figure 1E:
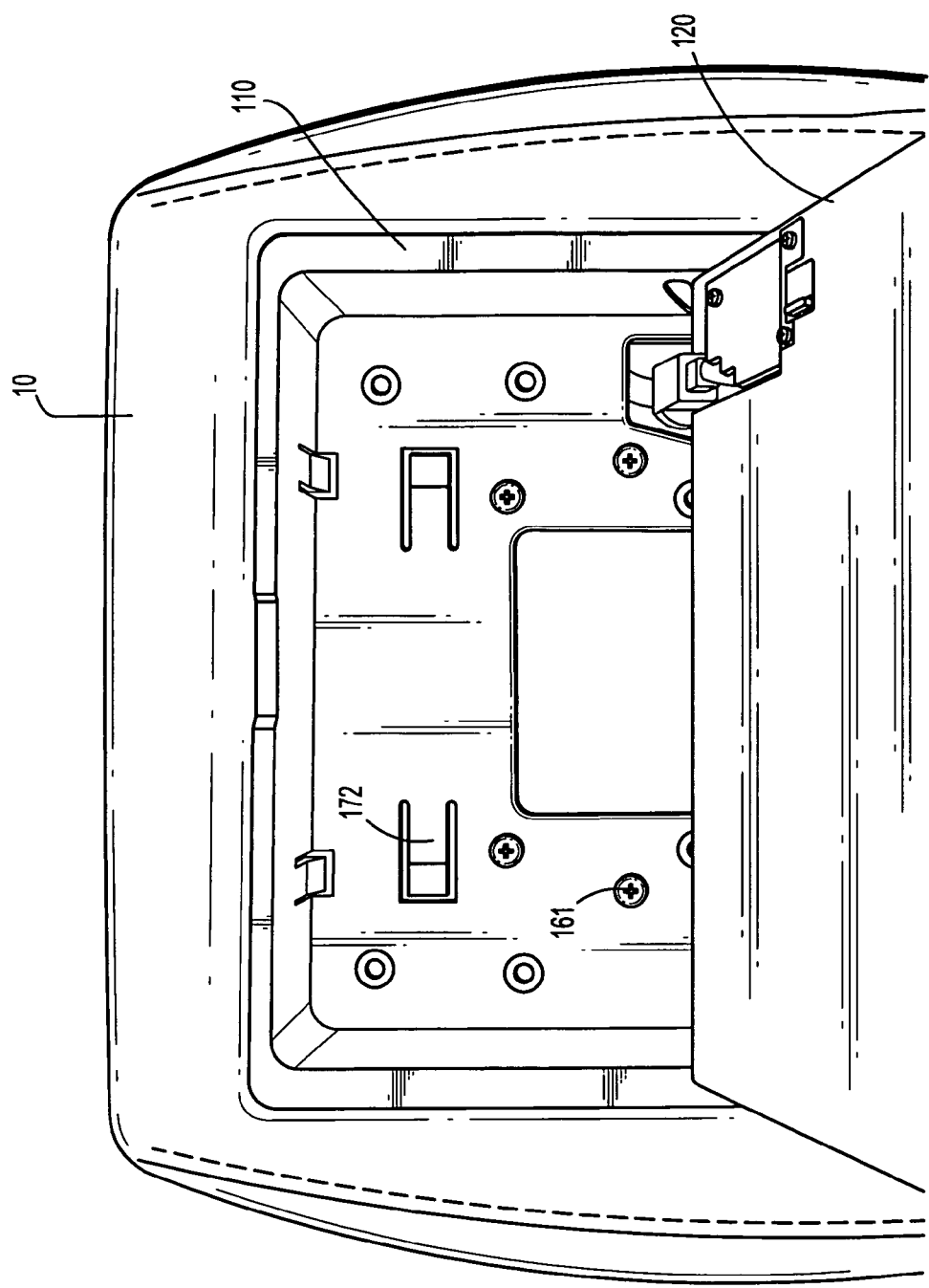
Figure 1F:
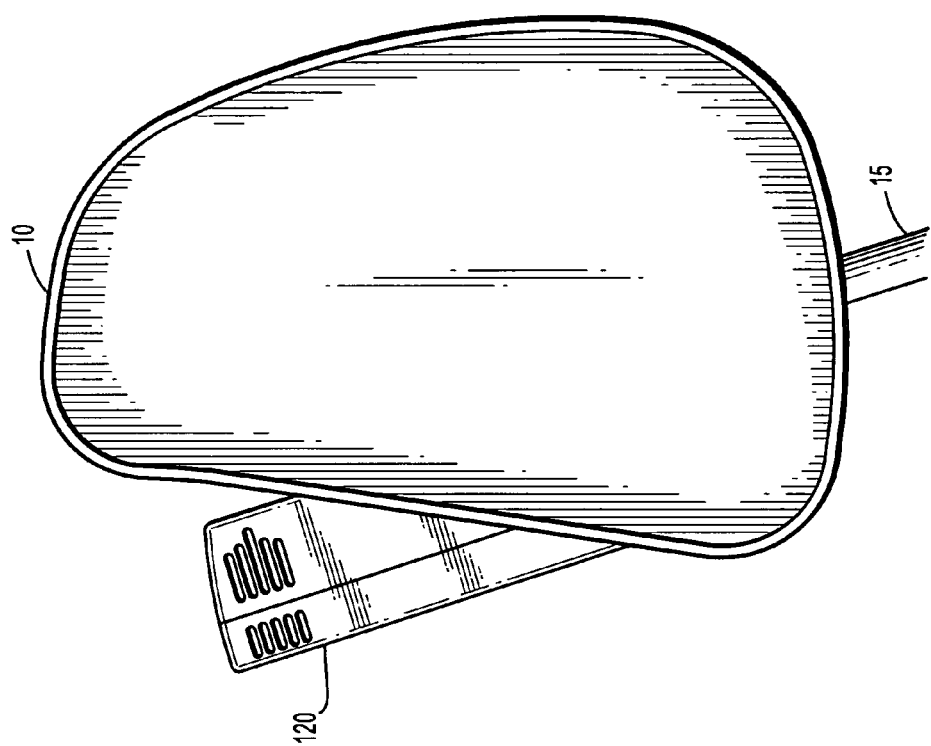
Figure 1H:
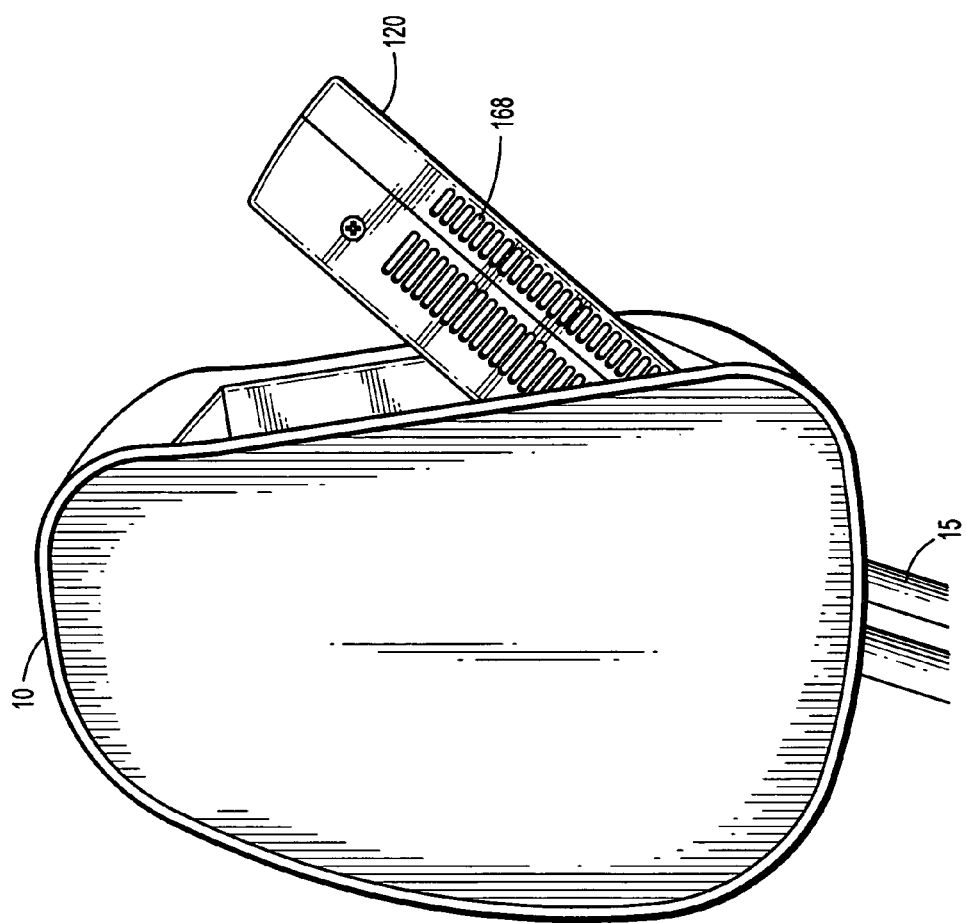
Figure 2A:
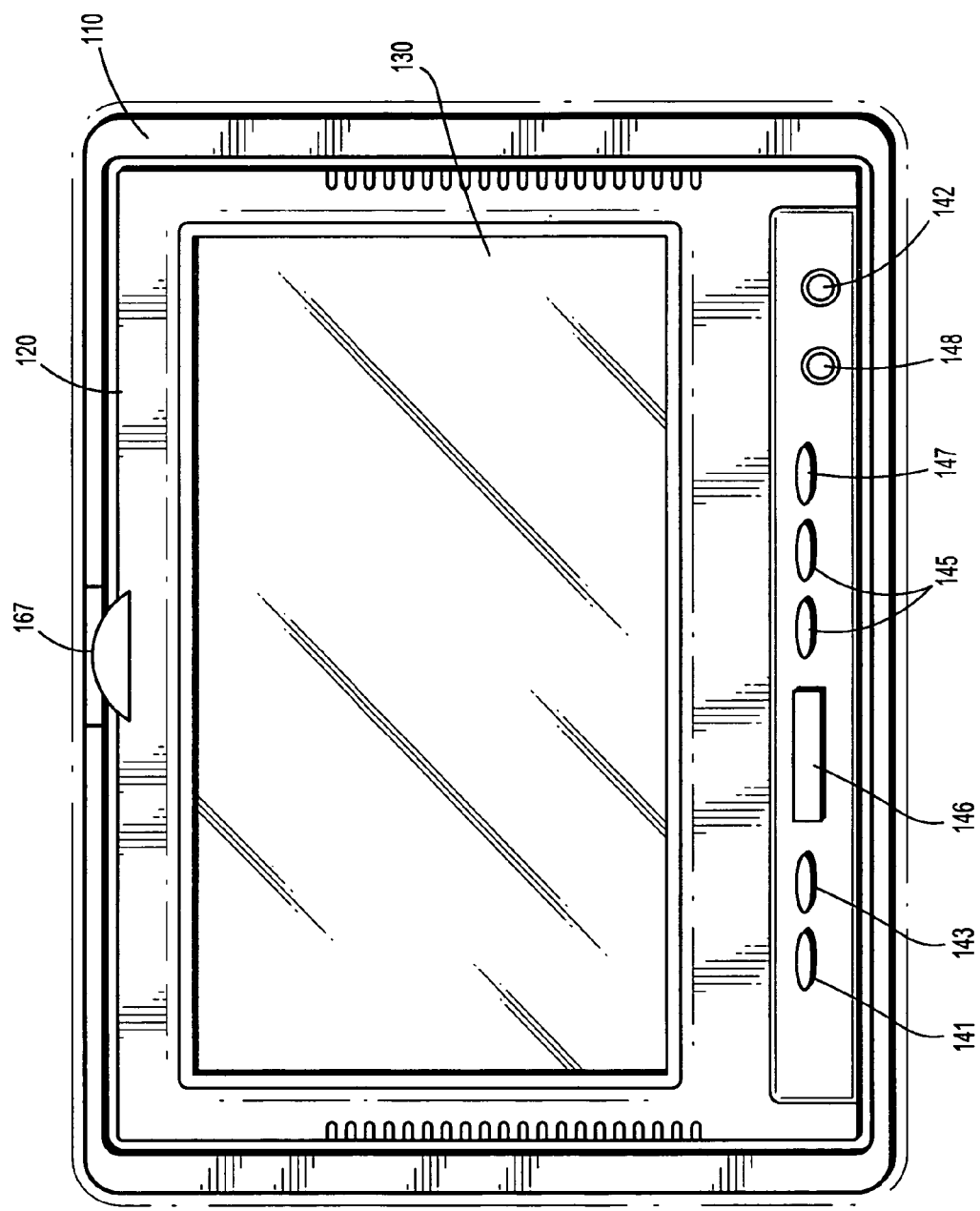
Figure 2C:
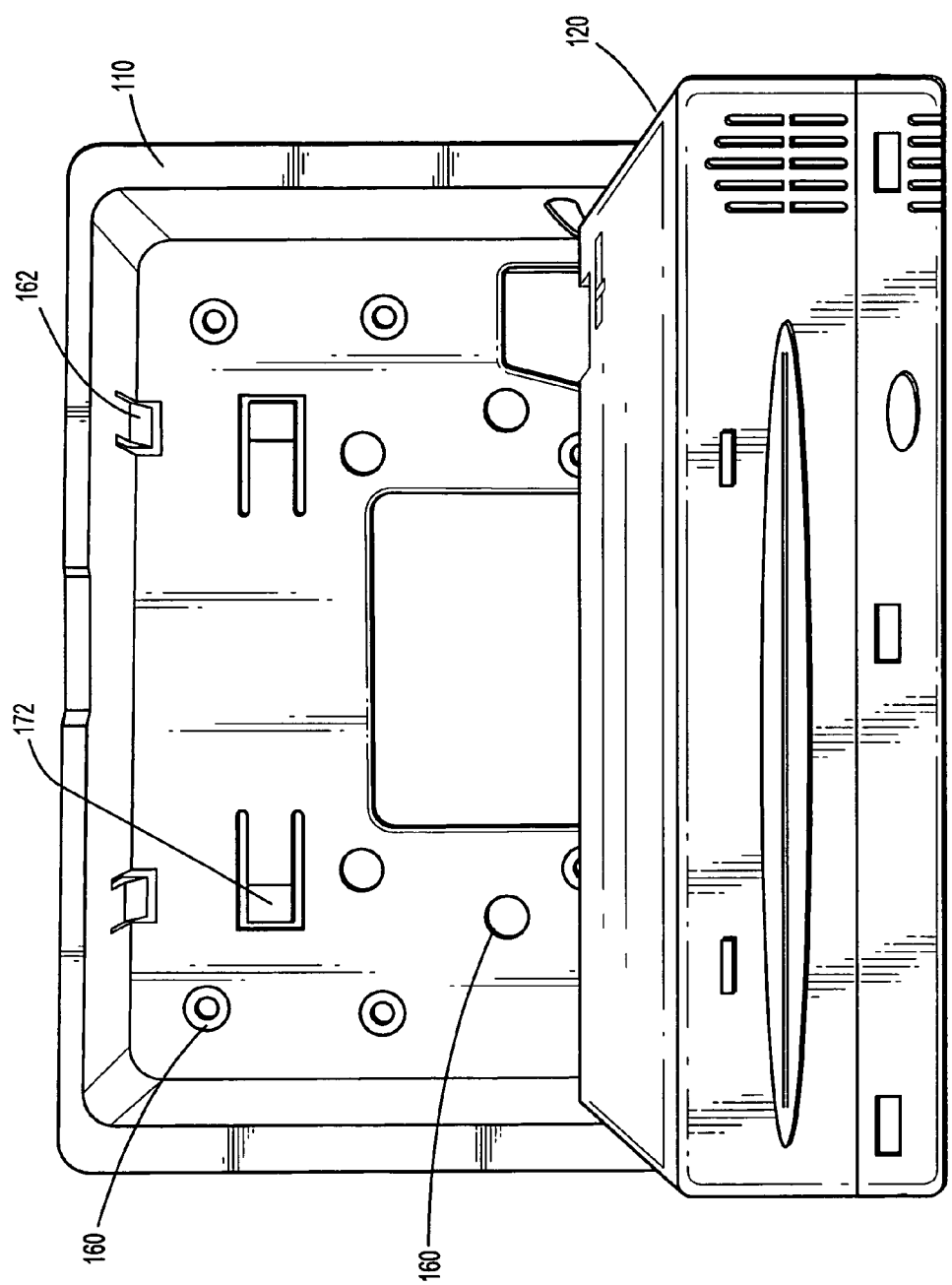
FIG. 2C shows a front view of the entertainment system with the media unit pivoted outward with respect to the housing, according to an embodiment of the present invention.
Figure 2D:
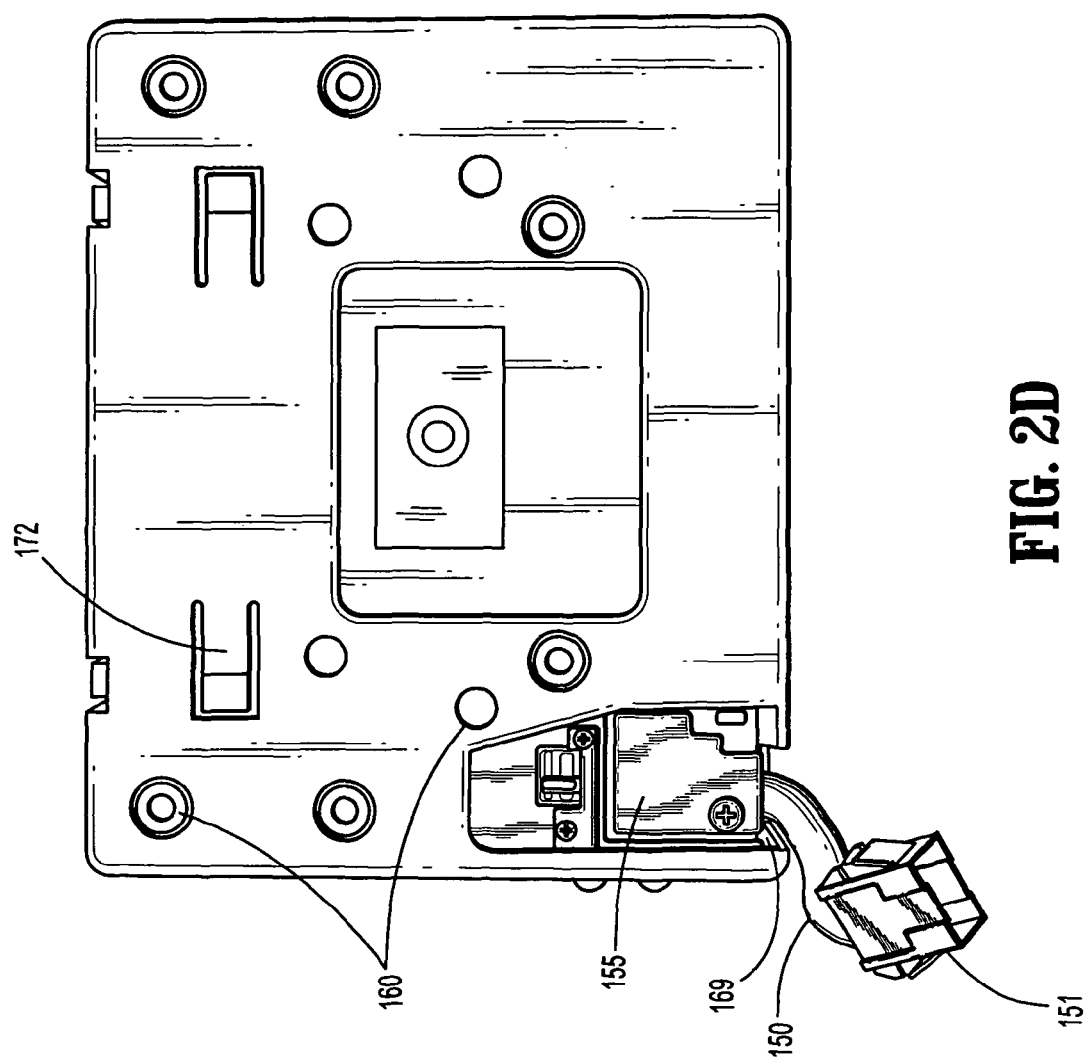
FIG. 2D shows a rear view of the entertainment system including the media unit coupled to the housing, according to an embodiment of the present invention.
Figure 2E:
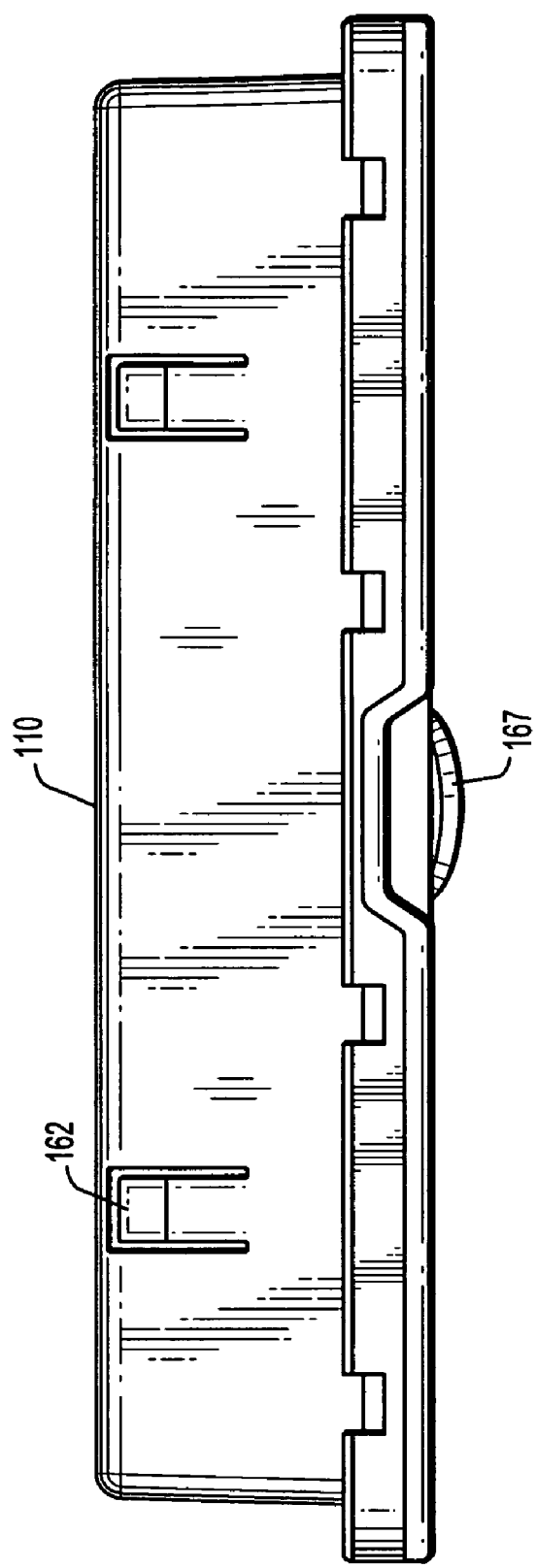
FIG. 2E shows a top view of the entertainment system including the media unit coupled to the housing, according to an embodiment of the present invention.
Figure 2F:
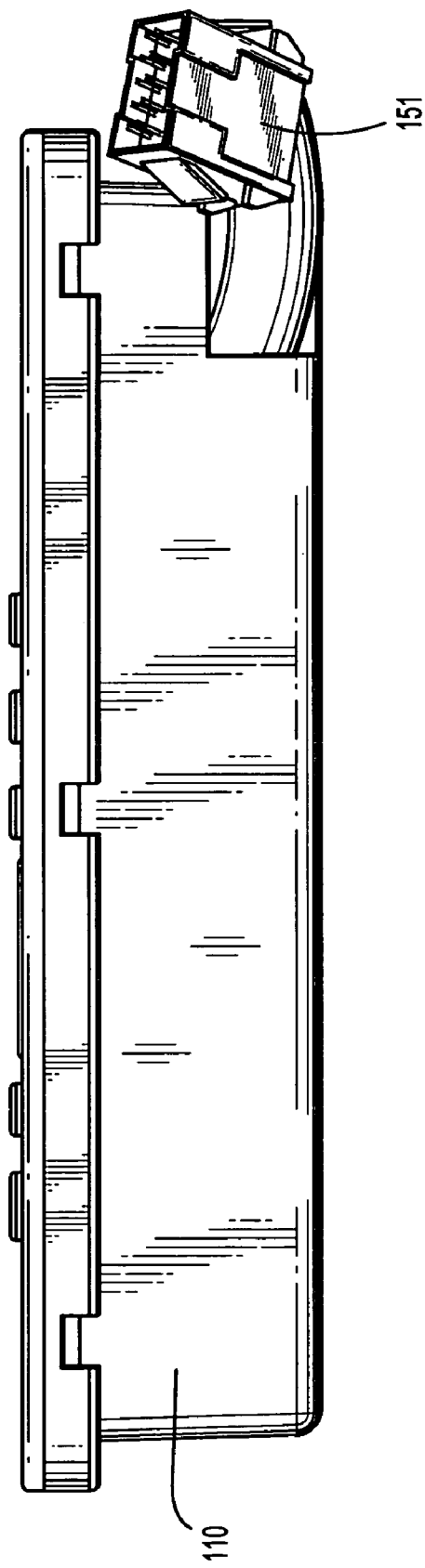
FIG. 2F shows a bottom view of the entertainment system including the media unit coupled to the housing, according to an embodiment of the present invention.
Figure 2G:
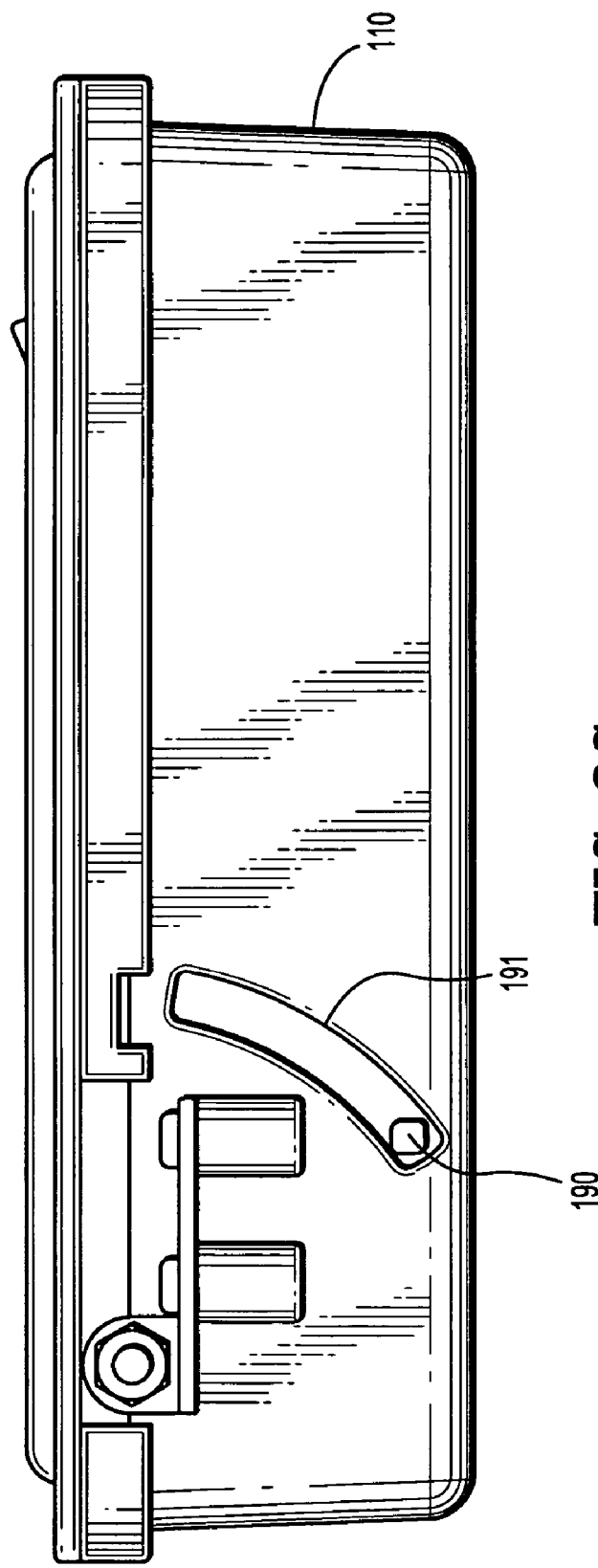
FIG. 2G shows a side view of the entertainment system including the media unit coupled to the housing, according to an embodiment of the present invention.
Figure 2H:
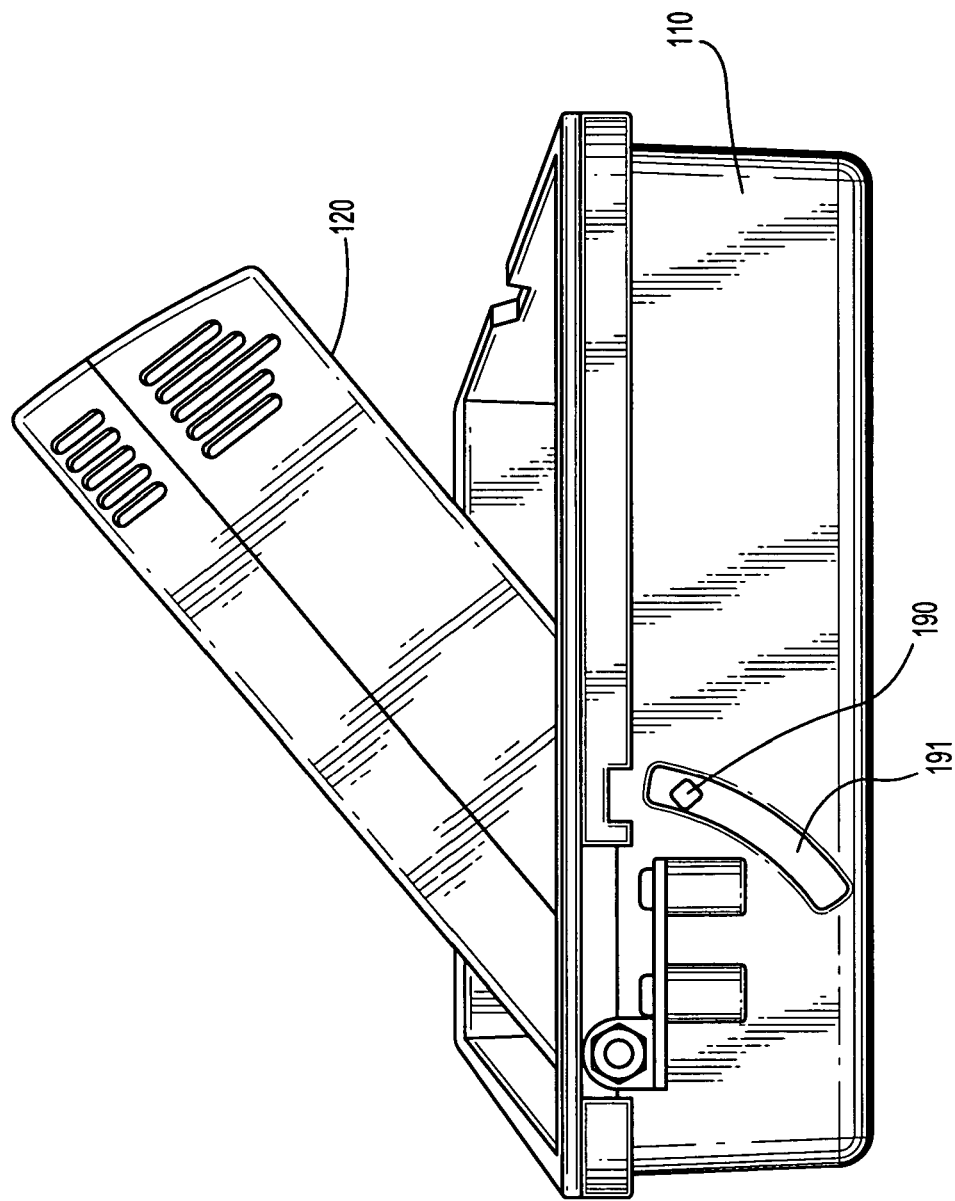
FIG. 2H shows a side view of the entertainment system including the media unit coupled to the housing, with the media unit pivoted outward with respect to the housing, according to an embodiment of the present invention.
Figure 3A:
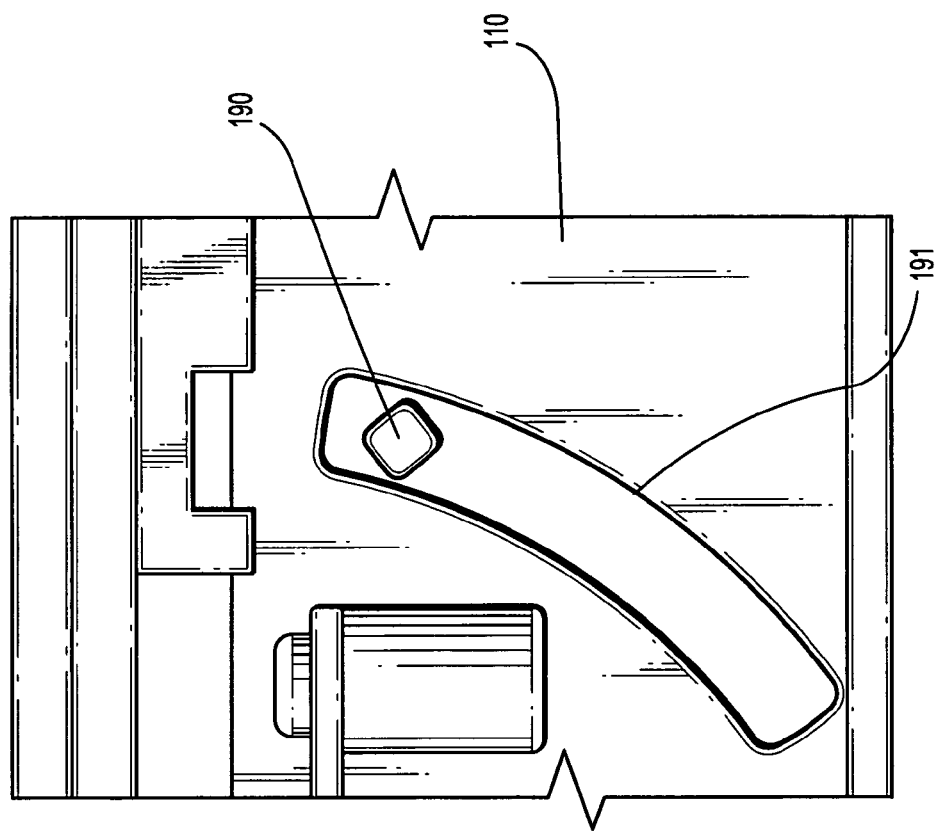
FIG. 3A shows a close-up view of a tab engaged with a slot for restricting pivoting of the media unit with respect to the housing, according to an embodiment of the present invention.
Figure 3B:
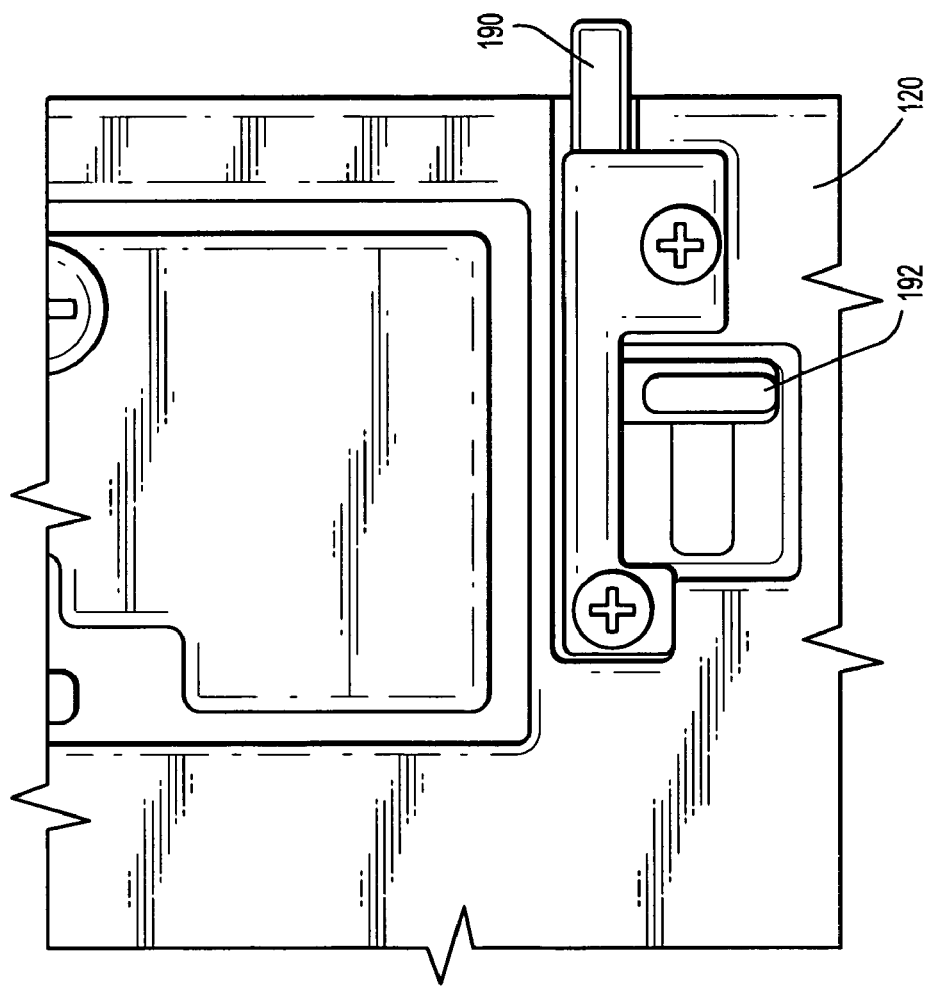
FIG. 3B shows a close-up view of the tab of FIG. 3A in the extended position, according to an embodiment of the present invention.

Referring to FIGS. 3A-3C (see also FIGS. 1D, 1E, 2D, 2H and 7A-7C), the media unit 120 includes a tab 190 on a back side thereof that can be extended to engage a curved slot/groove 191 formed in a sidewall of the housing 110. The groove 191 follows the rotation of the media unit 120 with respect to the housing 110 and, as shown in FIGS. 2G-2H, engagement of the tab 190 with the groove 191 restricts an angle of rotation of media unit 120 in a range of approximately 0° to approximately 45°.

As shown in FIGS. 3B-3C, the tab 190 can be extended or retracted by sliding a handle 192 attached to the tab 190 in opposite lateral directions. When the tab 190 is in the retracted position as shown in FIG. 3C, the tab 190 is not engaged with the groove 191. As a result, the media unit 120 can be pivoted to angles greater than about 45°, to, for example, about 90° and about 135° with respect to the housing 110, as shown in FIGS. 1C-1E and 1G. As shown in FIG. 1E, pivoting the media unit 120 to greater angles with respect to the housing 110 permits access to fixing devices 161 for coupling the housing 110 to the headrest 10, and to electrical connectors 151 and 153 to facilitate removal of the housing and/or media unit from the seat.

In an embodiment, the media unit 120 can be operated when the media unit 120 is not positioned in the housing 110. The media unit 120 may receive power by connecting to a specialized battery or battery pack, household batteries and/or an AC/DC adapter. The connection between the battery pack and the media unit 120 may be provided through any appropriate electrical contracts, for example, contacts for connecting to Lithium or NiCad batteries. The media unit 120 can connect to an AC/DC adapter via an AC/DC adapter port. Alternatively, a battery housing in the media unit 120 can be used to receive household batteries or compact battery packs.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. An entertainment system for a seat of a vehicle comprising:
   a housing adapted for being mounted within a seat of a vehicle; and
   a media unit housed within the housing and pivotably coupled to the housing, and wherein the housing includes a curved groove formed within a sidewall of the housing adapted to engage a laterally movable latch located on a backside of the media unit, wherein the latch includes a tab and a handle attached to the tab, and wherein the tab of the latch can be extended to engage the curved groove or retracted such that the tab of the latch is not engaged with the curved groove by sliding the handle of the latch in opposite lateral directions.

2. The entertainment system of claim 1, further comprising:
   a flexible member provided on a sidewall of the housing to engage a portion of the media unit for snapping the media unit into place within the housing.

3. The entertainment system of claim 2, wherein the portion of the media unit engaging the flexible member includes a tab, and wherein the flexible member flexes away from a center of the housing by pressure from the tab when the media unit is pivoted into the housing and once the tab passes the flexible member, the flexible member flexes toward the center of the housing.

4. The entertainment system of claim 1, further comprising:
   a flexible member disposed in a face of the housing to provide a spring force on the media unit in a direction away from the housing.

5. The entertainment system of claim 1, wherein the housing is mounted in a headrest of the seat of the vehicle.

6. The entertainment system of claim 1, wherein the media unit includes at least one of a DVD player, an MPEG player or a video game player.

7. The entertainment system of claim 1, wherein the groove follows rotation of the media unit with respect to the housing.

8. The entertainment system of claim 7, wherein engagement of the movable latch with the groove restricts the angle of rotation of the media unit with respect to the housing in a range of about 0 degrees to about 45 degrees.

9. The entertainment system of claim 1, wherein the media unit is pivotably connected to the housing via a hinge assembly, and the hinge assembly includes a first hinge portion located on a side of the media unit, the first hinge portion including a plate through which a fixing device is driven into a recess formed in the housing.

10. The entertainment system of claim 9, wherein the hinge assembly further includes a second hinge portion formed on a side of the media unit opposite to the side of the media unit on which the first hinge portion is formed, and the second hinge portion being adapted to fit in a recess formed in the housing.

11. The entertainment system of claim 10, wherein the media unit may be pivoted to an angle of about 135 degrees with respect to the housing.

12. The entertainment system of claim 1, further comprising an electrical connection assembly for electrically connecting the media unit to wire leads running through a support rod of a headrest of the seat of the vehicle.

13. The entertainment system of claim 12, wherein the electrical connection assembly includes an electrical connector positioned at a rear portion of the media unit having first and second opposing pin connectors, a first mating pin connector positioned in the headrest, and a second mating pin connector positioned in the media unit, and wherein the first opposing pin connector connects to the first mating pin connector and the second opposing pin connector connects to the second mating pin connector.

14. The entertainment system of claim 13, wherein the housing includes an opening for receiving therein at least the second opposing pin connector.

15. The entertainment system of claim 13, further comprising a cover affixed to the rear portion of the media unit for holding the electrical connector in place and for covering at least the second opposing pin connector and the second mating pin connector which are connected to one another.

16. The entertainment system of claim 15, wherein the cover further includes a hole for receiving a fixing device therein.

17. The entertainment system of claim 16, wherein the cover further includes tabs for fitting into slots in the media unit.

18. An entertainment system mounted in a headrest of a seat of a vehicle comprising:
   a media unit housing mounted within the headrest, the housing having a first sidewall, second sidewall, third sidewall and fourth sidewall and a face, the first and second sidewalls being connected to each other via the third and fourth sidewalls, and the first, second, third and fourth sidewalls each being substantially perpendicular to the face, wherein the housing includes a pair of first flexible members provided on one of the sidewalls of the housing; and
   a media unit housed within the housing and pivotably coupled to the housing, wherein the first flexible members snap over a pair of tabs located on a surface of the media unit to hold the media unit in place within the housing.

19. The entertainment system of claim 18, further comprising:
   a pair of second flexible members disposed in the face of the housing to provide a spring force on the media unit in a direction away from the housing.

20. The entertainment system of claim 18, wherein the detachable media unit includes a laterally movable latch located at the rear of the media unit for engaging a curved groove formed in the first sidewall of the housing.

21. The entertainment system of claim 18, further comprising an electrical connection assembly for electrically connecting the media unit to wire leads running through a support rod of the headrest, wherein the electrical connection assembly comprises an electrical connector having first and second opposing pin connectors, a first mating pin connector positioned in the headrest, and a second mating pin connector positioned in the media unit, wherein the first opposing pin connector connects to the first mating pin connector and the second opposing pin connector connects to the second mating pin connector.

22. The entertainment system of claim 21, wherein the housing includes an opening for receiving therein at least the second opposing pin connector.

23. The entertainment system of claim 21, further comprising a cover affixed within an opening in the rear portion of the media unit for holding the electrical connector in place.

24. A support structure for supporting an entertainment system within a seat of a vehicle comprising:
a housing adapted for being mounted within the seat of a vehicle and for pivotably housing a media unit therein,
wherein the housing includes first biased members disposed within a face of the housing to provide a force on the media unit in a direction away from the housing.

25. The support structure of claim 24, wherein the housing further includes a curved groove formed within a sidewall of the housing which follows rotation of the media unit with respect to the housing, wherein the curved groove engages a movable latch located within a rear portion of the media unit to restrict an angle of rotation of the media unit with respect to the housing.

26. The entertainment system of claim 24, further comprising second biased members disposed on a sidewall of the housing, wherein the second biased members flex in a first direction by pressure from tabs located on the media unit when the media unit is pivoted into the housing and once the tabs pass the biased members, the second biased members flex in a second direction opposite the first direction to snap the media unit into place within the housing.

27. The support structure of claim 24, wherein the housing includes an opening therein through which at least a portion of an electrical connection assembly for electrically connecting the media unit to wire leads running through the seat of the vehicle may be received.

28. An electrical connection assembly for electrically connecting a media unit housed within a seat of a vehicle to wire leads running through the seat of the vehicle comprising:
an electrical connector having first and second opposing pin connectors;
a first mating pin connector positioned in the seat of the vehicle, and a second mating pin connector positioned in the media unit, and wherein the first opposing pin connector connects to the first mating pin connector and the second opposing pin connector connects to the second mating pin connector; and
a cover for holding the electrical connector in place and affixed within a portion of the media unit wherein the second opposing pin connector and the second mating pin connector are positioned.

29. An entertainment system for a seat of a vehicle comprising:
a housing adapted for being mounted within a seat of a vehicle; and
a media unit housed within the housing and pivotably coupled to the housing, and wherein the housing includes at least one of a groove formed within a sidewall of the housing adapted to engage a movable latch of the media unit, a first flexible member provided on a sidewall of the housing to engage a portion of the media unit for snapping the media unit into place within the housing, or a second flexible member disposed in a face of the housing to provide a spring force on the media unit in a direction away from the housing.

30. The entertainment system of claim 29, wherein the housing includes the groove and the groove is a curved groove which follows rotation of the media unit with respect to the housing.

31. The entertainment system of claim 30, wherein the housing includes the first flexible member, the portion of the media unit engaging the first flexible member includes a tab, and wherein the first flexible member flexes away from a center of the housing by pressure from the tab when the media unit is pivoted into the housing and once the tab passes the flexible member, the flexible member flexes toward the center of the housing.

32. The entertainment system of claim 30, wherein the housing includes the second flexible member.

* * * * *